United States Patent
Nishichi et al.

(10) Patent No.: US 7,678,881 B2
(45) Date of Patent: Mar. 16, 2010

(54) TRANSPARENT RESIN MATERIAL

(75) Inventors: Ai Nishichi, Osaka (JP); Yoshinobu Asako, Hyogo (JP); Kazushi Omote, Nara (JP); Shimpei Sato, Osaka (JP); Toshiya Iida, Osaka (JP); Satoshi Ishida, Kyoto (JP)

(73) Assignee: Nippon Shokubai Co., Ltd., Osaka-shi (JP)

( * ) Notice: Subject to any disclaimer, the term of this patent is extended or adjusted under 35 U.S.C. 154(b) by 860 days.

(21) Appl. No.: 10/908,843

(22) Filed: May 27, 2005

(65) Prior Publication Data

US 2005/0282996 A1    Dec. 22, 2005

(30) Foreign Application Priority Data

| May 28, 2004 | (JP) | 2004-160154 |
| Aug. 3, 2004 | (JP) | 2004-226815 |
| Aug. 11, 2004 | (JP) | 2004-234514 |
| Nov. 29, 2004 | (JP) | 2004-344273 |
| Dec. 1, 2004 | (JP) | 2004-349160 |

(51) Int. Cl.
*C08G 73/24* (2006.01)
*C08G 73/00* (2006.01)
*G02B 1/00* (2006.01)

(52) U.S. Cl. .................. 528/401; 528/422; 528/425; 528/86

(58) Field of Classification Search .......... 528/401, 528/422, 425, 86
See application file for complete search history.

(56) References Cited

U.S. PATENT DOCUMENTS 6,172,181 B1   1/2001   Kimura et al.

FOREIGN PATENT DOCUMENTS

| DE | 101 45 945 A1 | 4/2002 |
| EP | 1 124 144 A1 | 8/2001 |
| EP | 1 256 592 A1 | 11/2002 |
| JP | 05-032731 A | 2/1993 |
| JP | 2000-089049 A | 3/2000 |
| JP | 2000-239325 A | 9/2000 |
| JP | 2001-064226 A | 3/2001 |
| JP | 2003-082091 A | 3/2003 |
| WO | WO 03/082969 A1 | 10/2003 |
| WO | WO 2005/012950 A2 | 2/2005 |

OTHER PUBLICATIONS

Murakami et al; Opticla protective film for polarizing plates; 2003; Nitto Denko Corporation JP; Chem Abstract 140: 17441.*

Kimura et al; Synthesis—poly(aryl ether ketone)s; 2002, Polymer Journal JP; Chem Abstract 137: 47543.*

Tajiri et al; Fluorinated aromatic—display devices; 2002; Nippon Shokubai Kagaku Kogyo Co., JP; Chem Abstract 136: 201404.*

* cited by examiner

*Primary Examiner*—Duc Truong
(74) *Attorney, Agent, or Firm*—Connolly Bove Lodge & Hutz LLP; Burton A. Amernick

(57) ABSTRACT

The present invention has an object to provide a transparent resin material having a low water absorption ratio without deteriorating various properties such as transparency which transparent resin has and also having a controllable refractive index. The present invention provides a transparent resin material containing a polymer capable of forming a formed product having transparency, wherein the transparent resin material comprises a fluorine atom-containing polymer and/or compound and contains 0.3 to 35% by weight of a fluorine atom in 100% by weight of the formed product.

7 Claims, No Drawings

TRANSPARENT RESIN MATERIAL

BACKGROUND OF THE INVENTION

The present invention relates to a transparent resin material. More particularly, the present invention relates to a transparent material to be used for a variety of applications such as optical communication, optical waveguide, optical recording, optical film, and substrate for display.

Polymers produced from fluorine-containing compounds are excellent in heat resistance and low moisture (low water) absorption property, so that they are widely used in industrial fields as raw materials for various films, electrolytic films for fuel cells, and engineering plastics. In recent years, these fluorine-containing polymers have attracted attention in various industrial fields and especially in optical and electronic part fields, fluorine-containing polymers excellent in transparency, electric properties, and other physical properties are desired. Furthermore, in optical communication, optical waveguide, optical recording, and liquid crystal display fields among these optical and electronic part fields, transparent resin represented by acrylic resin and polycarbonate resin tends to be used more and more, and resin having physical properties required for these uses has been desired. However, many of the transparent resin has water absorption property, and absorption of water in the transparent resin results in various adverse effects such as occurrence of warping and strains of molded(formed) products and increase of transmission loss. Therefore, many investigations have been carried out to decrease the water absorption in the transparent resin, however so far, no transparent resin suitable to be used for applications in optical communication, optical waveguide, optical recording, and liquid crystal display fields has been developed yet.

As conventional fluorine-containing polymers, fluorine-containing aryl ether ketone polymers are disclosed in Japanese Kokai Publication 2001-64226 (p. 1, 2 and 11) and 2003-82091 (p. 1, 2 and 8). These polymers comprise monomer units having a fluorine-substituted benzene ring and phenyl ether structure and exhibits basic properties such as solubility in solvent and heat resistance. However, there is a room for contrivance to provide fluorine-containing polymers with further improved properties so as to be suitably used for optical and electronic parts and additives for resin.

With respect to a material containing conventional transparent resin, Japanese Kokai Publication 2000-239325 (p. 2, 3) discloses resin compositions containing a polymer (A) containing a repeating unit of 6-membered ring structure having ether bond and a (meth)acrylic polymer (B), and Japanese Kokai Publication Hei-05-32731 (p. 2, 4) discloses a low water-absorption transparent resin produced by injection polymerization of compositions containing phenyl methacrylate, dicyclopentenyl acrylate, and alkyl acrylate having alkyl group of 1 to 5 carbon atoms and crosslinking agent in the presence of a radical polymerization initiator. With respect to these resin compositions, there are descriptions that they are usable for optical parts such as lens, optical information recording media such as optical disk, and materials for optical transmission. Furthermore, Japanese Kokai Publication 2000-89049 (p. 2, 3) discloses polymer materials for optical communication which comprises a repeating unit consisted of ester-bonded compounds containing nitrogen atom in main chains.

However, there is a room for contrivance for providing the material containing these transparent resin with improved low water-absorption property and preferably usable for various applications such as optical communication, optical waveguide, optical recording, and liquid crystal display fields.

SUMMARY OF THE INVENTION

In view of the above-mentioned state of the art, it is an object of the present invention to provide a transparent resin material having a low water absorption ratio without deteriorating various properties such as transparency which transparent resin has and also controllable refractive index.

Inventors of the present invention have made various investigations for lowering water absorption ratio of transparent resin and have found that owing to excellent water repellency of fluorine, it is made possible to lower the water absorption of the transparent resin and to control the refractive index of the transparent resin without deteriorating various properties such as transparency and thermal properties which the transparent resin originally have by adding fluorine atom to the transparent resin in one of the forms; (1) a complex of an acrylic resin and an aromatic fluorine-containing compound; (2) a complex of an acrylic resin and an aromatic fluorine-containing oligomer or polymer; and (3) an acrylic resin into which an aromatic fluorine-containing compound is introduced by chemical bond. And the inventors have reached the solution of the above-mentioned problems. Furthermore, it is supposed that the transparency is deteriorated when other compounds are added to and mixed with transparent resin just like the case (1), but the inventors of the present invention have found that when aromatic fluorine-containing compound is mixed, aromatic fluorine-containing compound can homogeneously and transparently mixed with transparent resin and the addition lowers water adsorption ratio and makes refractive index controllable and at the same time it is effective to restrict reduction of heat resistance and increase of the optical loss.

The present inventors have made more investigations of material to be preferably usable in the optical and electronic part fields and consequently have found that fluorine-containing polymer having the structural unit comprising a structure in which an oxadiazole ring is contained between fluorine-substituted two benzene rings and a structure derived from a diol compound are excellent in optical and electric properties such as transparency and dielectric constant as well as excellent in solubility in solvents, heat resistance, water repellency, and in addition, excellent in adhesive property and sticking property and that the material using the fluorine-containing oxadiazole polymer is preferably usable in the optical and electronic part fields. Furthermore, the present inventors have found that when the fluorine-containing oxadiazole polymer and/or fluorine-containing oxadiazole compound having the structure comprising an oxadiazole ring between fluorine-substituted two benzene rings are added to acrylic resin, the addition can effectively lower water absorption property of the resin and thus the addition provides transparent resin material preferably usable for optical communication, optical waveguide, optical recording, liquid crystal display and the like in which low water absorption property is required to prevent adverse effects, such as occurrence of warping and strains of molded product and increase of transmission loss owing to the water absorption.

The present inventors further investigated fluorine-containing compounds preferably usable in various fields of electronic information material and optical material, and the present inventors also have found that when the fluorine-containing compound has a structure in which fluorine-substituted two benzene rings and divalent organic groups with a specified structure is bonded by ester bond, the compound is provided with excellent lower water absorption property and weathering resistance and also excellent in solubility in various solvents and high reactivity and therefore, polymer may be produced at a lower temperature than that required for polymerization reaction of conventional fluorine-containing compounds.

And the present inventors have found that polymer excellent in heat resistance, electric properties and other characteristics such as transparency and weathering resistance as well as low water absorption property may be produced by reaction of such a fluorine-containing compound and a compound having two hydroxyl groups in one molecule, and that the polymers may be formed in various forms such as films, fibers, pellets, and sheets depending on the necessity in various fields of electronic information materials, precision machine materials, optical materials and preferably used, since the polymer are excellent in solubility in solvent. The inventors have found that when the fluorine-containing compound and/or the fluorine-containing polymer are added as additives to resin, the addition can lower the water absorption property of the resin. Particularly, since the fluorine-containing compound and the fluorine-containing polymer have ester structure, they are excellent in compatibility with ester resin having ester bond in the structure, and when these compound and/or polymer are added to resin as additives, the addition more effectively lower the water absorption property of the resin and the resulting resin may be a transparent resin material preferably usable in fields of optical communication, optical waveguide, optical recording, liquid crystal display and the like in which low water absorption resin are required for preventing adverse effects caused by the water absorption of resin and also preferably usable for electronic information materials and precision machine materials. And the present inventors have found that the fluorine-containing compound, the fluorine-containing polymer, and the transparent resin materials of the present invention are excellent in refractive index and also use of them makes precise control of the refractive index possible.

Furthermore, the present inventors have made various investigations of fluorine-containing compound and have found that when a novel fluorine-containing compound having a structure in which hydrogen atom of a benzene ring having cyano group as a substituent group is replaced with fluorine atom and one or more fluoroalkyl groups are bonded to the benzene ring through oxygen atom (O) or sulfur atom (S) are added to transparent resin such as acrylic resin, fluorine excellent in water repellency provides the transparent resin with lowered water absorption property and excellent water repellency and at the same time the refractive index of the transparent resin may be controlled without deteriorating various properties such as thermal properties which the transparent resin originally have and accordingly, the inventors have reached the solution of the above-mentioned problems and have completed the present invention.

That is, the present invention provides a transparent resin material containing a polymer capable of forming a formed product having transparency, wherein the transparent resin material comprises a fluorine atom-containing polymer and/or compound and contains 0.3 to 35% by weight of a fluorine atom in 100% by weight of the formed product.

The present invention also provides an additive for resin comprising a polymer and/or compound having a fluorine atom directly bonded to an aromatic ring, wherein the fluorine atom-containing polymer is a polymer comprising a fluorine-containing oxadiazole structure unit represented by the following formula (14):

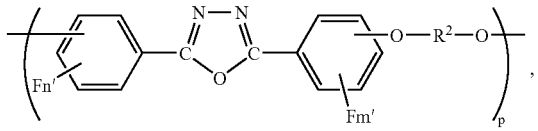

in the formula, m' and n' are same or different and each represents the number of fluorine atom bonded to a benzene ring and is an integer of 0 to 4; m'+n' is 1 or more; $R^2$ represents a divalent organic group having 1 to 150 carbon atoms; and p represents a polymerization degree, and the fluorine atom-containing compound is an fluorine-containing oxadiazole compound represented by the following formula (15):

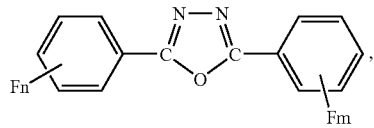

in the formula, m and n are same or different and each represents the number of fluorine atom bonded to a benzene ring and is an integer of 0 to 5; m+n is 1 or more.

The present invention also provides an additive for resin comprising a polymer and/or compound having a fluorine atom directly bonded to an aromatic ring, wherein the fluorine atom-containing compound is a compound represented by the following formula (1):

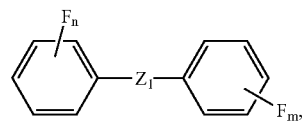

in the formula, $Z^1$ represents a divalent organic group or a direct bond between benzene rings; n and m each represents an integer of 0 to 5; n+m is 1 or more; a hydrogen atom in the benzene ring may be replaced with a substituent group other than fluorine atom.

The present invention also provides an additive for resin comprising a polymer and/or compound having a fluorine atom directly bonded to an aromatic ring, wherein the fluorine atom-containing compound is a compound represented by the following formula (11):

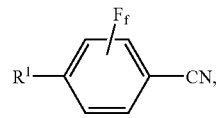

in the formula, $R^1$ represents an alkyl group having 1 to 12 carbon atoms, an alkoxy group having 1 to 12 carbon atoms, an alkylamino group having 1 to 12 carbon atoms, an alkylthio group having 1 to 12 carbon atoms, an aryl group having 6 to 20 carbon atoms, an aryloxy group having 6 to 20 carbon atoms, an arylamino group having 6 to 20 carbon atoms, or an arylthio group having 6 to 20 carbon atoms, which each may contain a substituent group; f represents the number of fluorine atom bonded to the aromatic ring and is an integer of 1 to 4.

The present invention also provides an additive for resin comprising a polymer and/or compound having a fluorine atom directly bonded to an aromatic ring, wherein the fluorine atom-containing polymer comprises a repeating unit represented by the following formula (12):

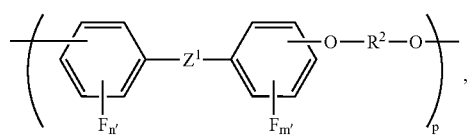

(12)

in the formula, $R^2$ represents a divalent organic group having 1 to 150 carbon atoms; $Z^1$ represents a divalent organic group or a direct bond between benzene rings; m' and n' are same or different and each represents the number of fluorine atom bonded to the benzene ring and is an integer of 0 to 4; m'+n' is 1 or more; p represents a polymerization degree; and a hydrogen atom of the benzene ring may be replaced with a substituent group other than a fluorine atom and/or a repeating unit represented by the formula (13):

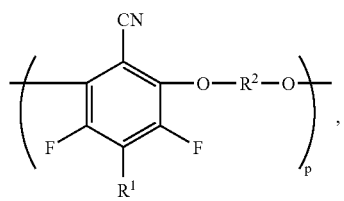

(13)

in the formula, $R^1$ represents an alkyl group having 1 to 12 carbon atoms, an alkoxy group having 1 to 12 carbon atoms, an alkylamino group having 1 to 12 carbon atoms, an alkylthio group having 1 to 12 carbon atoms, an aryl group having 6 to 20 carbon atoms, an aryloxy group having 6 to 20 carbon atoms, an arylamino group having 6 to 20 carbon atoms, or an arylthio group having 6 to 20 carbon atoms, which each may contain a substituent group; $R^2$ represents a divalent organic group having 1 to 150 carbon atoms; and p represents a polymerization degree.

The present invention also provides an additive for resin comprising a polymer and/or compound having a fluorine atom directly bonded to an aromatic ring, wherein the fluorine atom-containing compound is a fluorine-containing ester compound represented by the following formula (16):

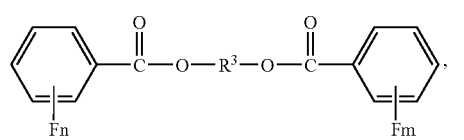

(16)

in the formula, m and n are same or different and each represents the number of fluorine atom bonded to a benzene ring and is an integer of 0 to 5; m+n is 1 or more; $R^3$ represents a divalent organic group having 1 to 150 carbon atoms, and the fluorine atom-containing polymer is a fluorine-containing aryl ester polymer comprising a repeating unit represented by the following formula (17):

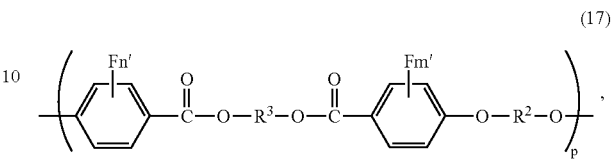

(17)

in the formula, m' and n' are same or different and each represents the number of fluorine atom bonded to a benzene ring and is an integer of 0 to 4; m'+n' is 1 or more; $R^2$ and $R^3$ are same or different and each represents a divalent organic group having 1 to 150 carbon atoms; and p represents a polymerization degree.

The present invention also provides an additive for resin comprising a compound having a fluorine atom directly bonded to an aromatic ring, wherein the fluorine atom-containing compound is a fluorine-containing compound represented by the following formula (22):

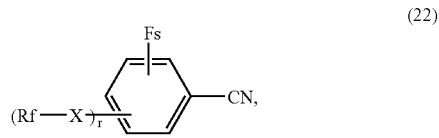

(22)

in the formula, X represents O or S; Rf represents a fluorine-containing alkyl group having 4 or more of carbon atoms; r represents the number of Rf—X— bonded to a aromatic ring and an integer of 1 or more; s represents the number of fluorine atom bonded to a aromatic ring and an integer of 1 or more; r+s is an integer of 2 to 5.

DETAILED DESCRIPTION OF THE INVENTION

Hereafter, the present invention will be described in detail.

A transparent resin material of the present invention comprises a polymer capable of forming a formed product having transparency and comprises a polymer and/or compound containing fluorine atom. The polymer capable of forming a formed product having transparency may or may not have fluorine atom and the polymer capable of forming a formed product having transparency may be same as the fluorine atom-containing polymer. Those material which can form a formed product having transparency may be used as such a transparent resin material and, for example, those containing transparent resin such acrylic resin as described later may be used.

The above-mentioned transparency means high light transmittance. The transparent resin material used herein means those having 70% or more of total luminous transmittance. As the measuring method, a method using colorimetry color difference meter NDH-1001 DP model (manufactured by Nippon Denshoku Kogyo Co., Ltd.) as a measurement apparatus may be exemplified.

The formed product is preferably a fiber, a formed body, a thick film and the like.

With respect to the above-mentioned formed product, the fiber means a fibrous formed product and preferably has a diameter of 10 μm or more and 10000 μm or less. The formed body is a formed product having a predetermined formed shape and examples thereof may include formed bodies with pallet-like shapes, sheet-like shapes such as a flat sheet and a corrugated sheet, and pipe-like shapes; and irregular formed bodies with semi-circular shapes, L-shapes, T-shapes, U-shapes, and hill-like shapes. The thick film is a film-like or sheet-like formed product and preferably has a thickness of 10 μm or more and 1000 μm or less.

Examples of a forming method of the above-mentioned formed product may preferably include methods of injection molding, extrusion molding, vacuum molding, blow molding, heat molding, compaction molding, calendar molding, powder molding, foaming molding, layer molding, solvent casting, spin coating and the like.

The transparent resin material of the present invention has the content of fluorine atom in a range of 0.3 to 35% by weight in 100% by weight of a formed product. The content of fluorine atom can be calculated by element analysis using flask combustion method, ion chromatography and the like.

When the content of fluorine atom is less than 0.3% by weight, water absorption property may be insufficiently lowered and when it exceeds 35% by weight, basic properties such as transparency and mechanical strength may be insufficiently exhibited. The lower limit of the content is preferably 0.5% by weight and more preferably 1.0% by weight. The upper limit is preferably 30% by weight and more preferably 25% by weight. The range of the content is preferably 0.5 to 30% by weight and more preferably 1.0 to 25% by weight.

Examples of the above-mentioned transparent resin material may include materials in the following forms (I) a mixture of transparent resin and a fluorine atom-containing compound; (II) a mixture of transparent resin and a fluorine atom-containing polymer; and (III) a polymer produced by introducing a fluorine atom-containing compound into transparent resin and the like, and these forms may be combined. In the present invention, the forms (I) and (II) are preferable since the transparent resin material may be produced more economically.

In the above-mentioned forms (I) and (II), examples of the transparent resin preferably used are acrylic resin, polycarbonate resin, fluoro resin, epoxy resin, polyether resin, polyester resin, polyallylate resin, polyimide resin, cycloolefin resin, silicon resin, norbornene resin, polysulfone resin, and polyketone resin and the like. Acrylic resin and polycarbonate resin are more preferable.

The above-mentioned acrylic resin preferably comprises a polymer produced by polymerization of monomer components essentially containing (meth)acrylic acid and its ester compounds, and for example, polymethyl methacrylate, polymethyl methacrylate copolymerized with other monomers, maleimide-modified polymethyl methacrylate, deuterated polymethyl methacrylate and the like are preferable. Mixtures and copolymers of the acrylic resins are also preferable.

The above-mentioned polycarbonate resin preferably comprises a polymer having carbonate bond (—O—CO—O—) in the main chain.

In the above-mentioned forms (I) and (II), the fluorine atom-containing compound and polymers are those which contain fluorine atom and those essentially containing polymer and/or compound having aromatic rings are more preferable. That is, those which have aromatic ring are preferable.

The fluorine atom-containing compound is preferable to be added in a ratio of 1 to 100% by weight to the polymer capable of forming a formed product having transparency. When it is less than 1% by weight, water absorption property may be insufficiently decreased and when it exceeds 100% by weight, basic properties such as transparency and mechanical strength may be insufficiently exhibited. The lower limit of the ratio is preferably 5% by weight and more preferably 10% by weight. The upper limit of the ratio is preferably 80% by weight and more preferably 70% by weight. The range of the ratio is preferably 5 to 80% by weight and more preferably 10 to 70% by weight.

One preferable embodiment of the present invention is that the fluorine atom-containing polymer and/or compound has an aromatic ring and is added in a ratio of 1 to 100% by weight to a polymer capable of forming a formed product having transparency. Furthermore, the transparent resin material of the present invention is controllable to precisely change the refractive index by properly setting the content of the fluorine atom-containing compound or polymer, and thus the material is valuable.

In the above-mentioned form (I), as described above, the fluorine atom-containing compound preferably has a aromatic ring and more preferably has a fluorine atom directly bonded to the aromatic ring. The compound has more preferably at least 1 structure represented by the following formulae (4) to (7).

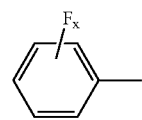

(4)

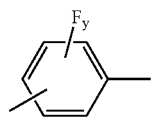

(5)

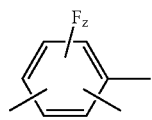

(6)

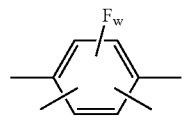

(7)

in the formulae, x, y, z, and w are same or different and each represents the number of fluorine atom bonded to the aromatic ring; x is an integer of 1 to 5; y is an integer of 1 to 4; z is an integer of 1 to 3; w is an integer of 1 to 2; hydrogen atom in the benzene ring may be replaced with a substituent group other than fluorine atom. Examples of such a substituent group are an alkyl, an alkoxyl, an alkylamino, and an alkylthio group, which each may contain other substituent group of 1 to 12 carbon atoms; an aryl, an aryloxy, an arylamino, an arylthio group, which each may contain other substituent group of 6 to 20 carbon atoms, and halogen atoms other than fluorine atom. Examples of the above-mentioned other substituent group include those preferable in $R^1$ to be hereinafter described.

As the above-mentioned fluorine atom-containing compound, more preferable example is compound represented by the following formula (1):

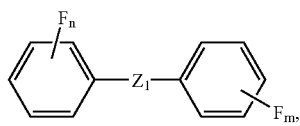
(1)

in the formula, $Z^1$ represents a divalent organic group or a direct bond between benzene rings; n and m each represents an integer of 0 to 5; n+m is 1 or more; hydrogen atom in the benzene ring may be replaced with a substituent group other than fluorine atom. The substituent group other than fluorine atom is same as those mentioned above.

In the form (I) and combination form of (I) and (II), use of the compound represented by the above-mentioned formula (1) as the fluorine atom-containing compound corresponds to use of the compound represented by the above-mentioned formula (1) as an additive for resin. The additive for resin comprising a polymer and/or compound having a fluorine atom directly bonded to the aromatic ring, wherein the fluorine atom-containing compound is a compound represented by the above-mentioned formula (1), is also one of the present invention. And the transparent resin material of the present invention, in which the fluorine atom-containing polymer and/or compound essentially comprise the aromatic ring-containing polymer and/or compound, and further comprises the fluorine atom directly bonded to the aromatic ring, includes the transparent resin material which becomes the transparent resin material of the present invention by containing the additive for resin of the present invention.

In the case where $Z^1$ in the above-mentioned formula (1) is a divalent organic group, $Z^1$ may represent any divalent organic group and preferably a group containing C, S, N and/or O atom. More preferably, $Z^1$ represents a group having a carbonyl group, a methylene group, a sulfide group, a sulfoxide group, a sulfone group, a heterocyclic ring or the like. Even more preferably, $Z^1$ represents a group represented by the following formula (2-1) to (2-15).

Among these formulae, the groups represented by the formulae (2-2), (2-5), and (2-9) are most preferable.

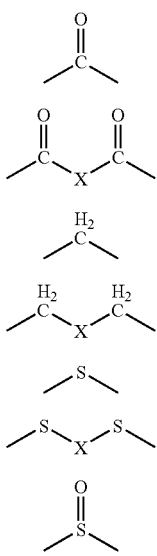

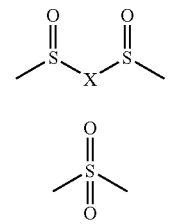

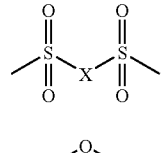

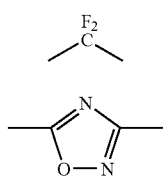

in the formulae, X may be a divalent organic group having an aromatic ring and preferably a group represented by the following formulae (3-1) to (3-18). $Y^1, Y^2, Y^3,$ and $Y^4$ in X are same or different and each represents a substituent group and one benzene ring has 0 to 4 substituent groups $Y^1, Y^2, Y^3,$ and $Y^4$.

Examples of the substituent groups of the above-mentioned $Y^1, Y^2, Y^3,$ and $Y^4$ preferably include an alkyl, alkoxy, alkylamino, alkylthio, aryl, aryloxy, arylamino, arylthio group, which each may contain a substituent group, and halogen atom. More preferably an alkyl or alkoxy group, which each has 1 to 30 carbon atoms and each may contain a substituent group, or halogen atom.

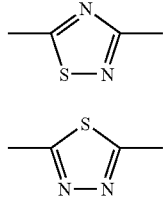
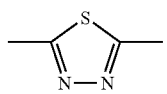
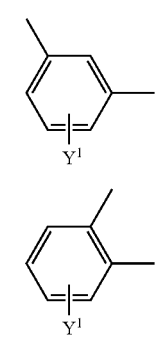

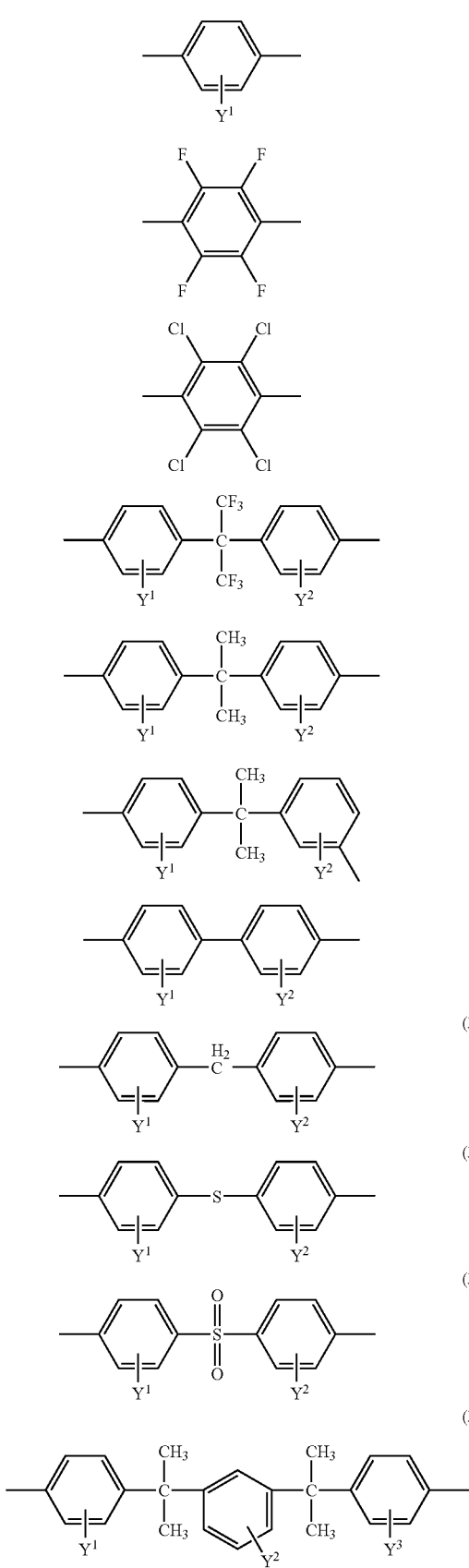
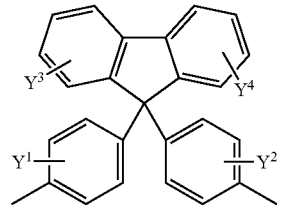
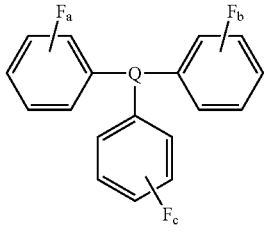
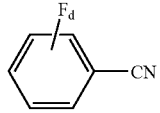
The groups represented by the above-mentioned formulae (3-1) to (3-18) are preferably groups represented by the following formulae (8-1) to (8-19).
The groups are more preferably those represented by the formulae (8-1), (8-2), (8-3), (8-12), (8-13), and (8-14).
As the above-mentioned fluorine atom-containing compound, compounds represented by the following formulae (9) to (11) are also preferable.

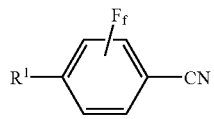

(11)

In the form (I) or combination of forms (I) and (II), use of any of the compound represented by the above-mentioned formulae (9) to (11) as the fluorine atom-containing compound corresponds to use of any of the compound represented by the above-mentioned formulae (9) to (11) as an additive for resin. Among these, an additive for resin comprising the compound represented by the above-mentioned formula (11), that is, an additive for resin comprising a polymer and/or compound having a fluorine atom directly bonded to the aromatic ring, wherein the fluorine atom-containing compound is a compound represented by the above-mentioned formula (11), is one of the present invention.

In the above formulae, Q is preferably P, N or B; a, b, c, d, and f each represents the number of fluorine atom bonded to the aromatic ring; a to c are respectively an integer of 1 to 5; d is an integer of 1 to 5; f is an integer of 1 to 4; $R^1$ represents an alkyl group of 1 to 12 carbon atoms, an alkoxy group of 1 to 12 carbon atoms, an alkylamino group of 1 to 12 carbon atoms, an alkylthio group of 1 to 12 carbon atoms, an aryl group of 6 to 20 carbon atoms, an aryloxy group of 6 to 20 carbon atoms, an arylamino group of 6 to 20 carbon atoms, an arylthio group of 6 to 20 carbon atoms, which each may contain a substituent group, or a halogen atom.

Preferable examples of the alkyl group are methyl, ethyl, propyl, isopropyl, butyl, isobutyl, sec-butyl, tert-butyl, pentyl, isopentyl, neopentyl, hexyl, heptyl, octyl, nonyl, decyl, undecyl, dodecyl, and 2-ethylhexyl group and the like.

Preferable examples of the alkoxy group are methoxy, ethoxy, propoxy, isopropoxy, butoxy, pentyloxy, hexyloxy, 2-ethylhexyloxy, octyloxy, nonyloxy, decyloxy, undecyloxy, dodecyloxy, furfuryloxy, and allyloxy group and the like.

Preferable examples of the alkamino group are methylamino, ethylamino, dimethylamino, diethylamino, propylamino, n-butylamino, sec-butylamino, and tert-butylamino group and the like.

Preferable examples of the alkylthio group are methylthio, ethylthio, propylthio, n-butylthio, sec-butylthio, tert-butylthio, and iso-propylthio group and the like.

Preferable examples of the aryl group are phenyl, benzyl, phenethyl, o-, m- or p-tolyl, 2,3- or 2,4-xylyl, mesityl, naphthyl, anthryl, phenanthryl, biphenylyl, benzhydryl, trityl, and pyrenyl group and the like.

Preferable examples of the aryloxy group are phenoxy, benzyloxy, groups derived from hydroxybenzoic acid and its esters (e.g. methyl ester, ethyl ester, methoxyethyl ester, ethoxyethyl ester, furfuryl ester, and phenyl ester), naphthoxy, o-, m-, or p-methylphenoxy, o-, m-, or p-phenylphenoxy, phenylethinylphenoxy group, and groups derived from cresotinic acid and its esters.

Preferable examples of the arylamino group are anilino, o-, m-, or p-toluidino, 1,2- or 1,3-xylidino, o-, m- or p-methoxyanilino group, and groups derived from anthranilic acid and its esters.

Preferable examples of the arylthio group are phenylthio, phenylmethanethio, o-, m-, or p-tolylthio group, and groups derived thiosalicylic acid and its esters.

Among them, as the above-mentioned $R^1$, alkoxy, aryloxy, arylthio, and arylamino group, which each may contain a substituent group is preferable. Additionally, $R^1$ may or may not have double or triple bond.

The substituent group in the above-mentioned $R^1$ is preferably the alkyl group of 1 to 12 carbon atoms as described above; halogen atom such as fluorine, chlorine, bromine, and iodine; cyano, nitro, and carboxy ester groups. Hydrogen atom of these substituent groups may or may not be replaced with a halogen atom. Among them, halogen atom, and methyl, ethyl, propyl, isopropyl, butyl, pentyl, hexyl, and carboxy ester groups, which each may or may not have halogen atoms substituted with halogen atoms are preferable.

In the above-mentioned form (II), the fluorine atom-containing polymer may be those produced by polymerizing fluorine atom-containing monomer components and may be oligomer. Preferably, as described above, the polymer has an aromatic ring. Such polymer and oligomer are preferably those essentially comprising repeating unit represented by the following formula (12) and/or those essentially comprising repeating unit represented by the following formula (13). The repeating units represented by the following formulae (12) and (13) may be respectively same or different and in the case where the fluorine atom-containing polymer is composed of different repeating units, it may be in form of a block or random polymer. With respect to the repeating unit represented by the following formula (12), the (—O—$R^2$—O—) part may be bonded to any carbons at o-, m- or p-position relative to the carbon in the benzene ring bonded to $Z^1$, and preferably bonded to carbons at o- or p-position.

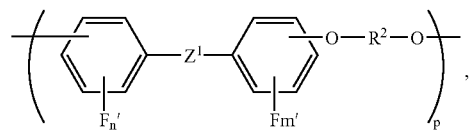

(12)

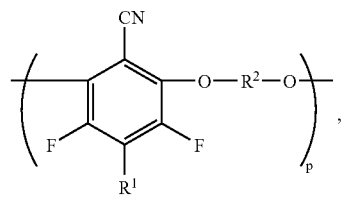

(13)

In the form (II) and combination of forms (I) and (II), use of the fluorine atom-containing polymer mixed with the transparent resin corresponds to use of the fluorine atom-containing polymer as an additive for resin. In the case, the polymer essentially comprising the repeating unit represented by the above-mentioned formula (12) and/or the repeating unit represented by the formula (13) is preferably used.

In the above-mentioned formula, $R^1$ represents the same as described above; the above-mentioned $Z^1$ represents the same as described above; m' and n' are same or different and each represents the number of fluorine atom bonded to a benzene ring and is an integer of 0 to 4; m'+n' is 1 or more; and p represents a polymerization degree; hydrogen atom in the benzene ring may be replaced with a substituent group other than fluorine atom. Examples of the substituent group other than fluorine atom are same as described above. The polymerization degree represented by the above-mentioned p is preferably in a range of 1 to 5000 and further preferably in a range of 1 to 500.

In the above-mentioned formula, $R^2$ may be any divalent organic group having 1 to 150 carbon atoms and having an aromatic ring and preferably a group represented by the formula (3-1) to (3-18). $Y^1$, $Y^2$, $Y^3$, and $Y^4$ in $R^2$ are same or different and each represents a substituent group and one benzene ring has 0 to 4 substituent groups $Y^1$, $Y^2$, $Y^3$, and $Y^4$.

Examples of the substituent group of the above-mentioned $Y^1$, $Y^2$, $Y^3$, and $Y^4$ preferably include an alkyl, alkoxy, alkylamino, alkylthio, aryl, aryloxy, arylamino, arylthio group, which each may contain a substituent group, and halogen atom and the like. More preferably an alkyl or alkoxy group, which each has 1 to 30 carbon atoms and each may contain a substituent group, and halogen atom.

As the groups represented by the above-mentioned formulae (3-1) to (3-18) are preferably groups represented by the above-mentioned formula (8-1) to (8-19), and groups represented by the formula (8-2), (8-3), (8-6), (8-7), and (8-12) are more preferable.

In the above-mentioned form (III), the polymer produced by introducing a fluorine-containing compound into a transparent resin are preferably polymers produced by introducing a fluorine-containing compound into above-mentioned transparent resin. Preferable methods of introducing the above-mentioned fluorine-containing compound may be (1) a method of copolymerizing the compound with transparent resin such as an acrylic resin or reacting the compound so that the compound becomes the side chain of the resin during the polymerization or after completion of the polymerization in the case where the fluorine-containing compound has double or triple bond; (2) a method of reacting the compound with nucleophilic site of the transparent resin in the case where the fluorine-containing compound comprises aromatic fluoride; and (3) a method of bonding the compound with the transparent resin using a crosslinking agent comprising an epoxy group, an isocyanate group or the like in the case where the transparent resin or the fluorine-containing compound comprises a hydroxyl group.

The above-mentioned fluorine-containing compound may be same or different from the fluorine atom-containing compound described above.

The additive for resin of the present invention is an additive for resin comprising a polymer and/or compound having a fluorine atom directly bonded to an aromatic ring, wherein the fluorine atom-containing polymer is a polymer comprising a fluorine-containing oxadiazole structure unit represented by the following formula (14):

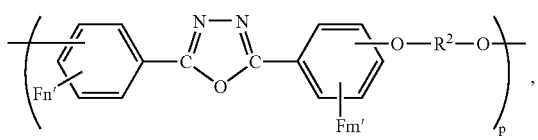

(14)

in the formula, m' and n' are same or different and each represents the number of fluorine atom bonded to a benzene ring and is an integer of 0 to 4; m'+n' is 1 or more; $R^2$ represents a divalent organic group having 1 to 150 carbon atoms; and p represents a polymerization degree, and the fluorine atom-containing compound is an fluorine-containing oxadiazole compound represented by the following formula (15):

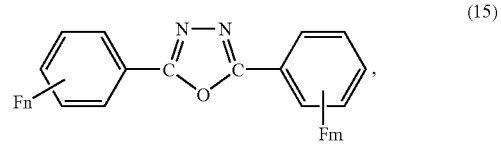

(15)

in the formula, m and n are same or different and each represents the number of fluorine atom bonded to a benzene ring and is an integer of 0 to 5; m+n is 1 or more. Addition of the additive for resin of the present invention to resin lowers the water absorption property of the transparent resin material and prevents occurrence of warping and strains of formed products caused by water absorption and adverse effects such as increase of transmission loss, therefore the additive can be preferably used for applications such as optical communication, optical waveguide, optical recording, liquid crystal display and the like in which a resin material with low water absorption property is particularly required especially in optical and electronic part fields.

The addition amount of the additive for resin of the present invention is preferably 1% by weight or more and 100% by weight or less in 100% by weight of resin. It is more preferably 5% by weight or more and 80% by weight or less.

When the addition amount of the additive for resin is 1% by weight or less, water absorption property of the transparent resin material may be insufficiently lowered.

The additive for resin of the present invention may be used for any resin and, for example, may be used for the above-mentioned transparent resin.

The additive for resin of the present invention may comprise either the polymer having the fluorine-containing oxadiazole structure unit represented by the above-mentioned formula (14) (hereinafter referred to as fluorine-containing oxadiazole polymer) or the fluorine-containing oxadiazole compound represented by the above-mentioned formula (15) or may comprise both of the polymer and compound. In the case where both the polymer and compound are comprised, the addition ratio of them is not especially limited.

In the above-mentioned formula (15), the number of the fluorine atom bonded to the benzene ring may be 1 to 5, preferably 3 to 5. And more preferably 5, that is, fluorine atoms are bonded to all carbon atoms other than the carbon atom bonded to the oxadiazole ring among 6 carbon atoms in the benzene ring. The benzene ring may be bonded with an atom or a substituent group other than fluorine atom.

The fluorine-containing oxadiazole polymer represented by the above-mentioned formula (14) may be used as material for optical and electronic parts. Use of the fluorine-containing oxadiazole polymer means that the material for optical and electronic parts contains the fluorine-containing oxadiazole polymer, in other words, that the fluorine-containing oxadiazole polymer is a component composing the material for optical and electronic parts.

The above-mentioned material for optical and electronic parts may contain other components as long as the fluorine-containing oxadiazole polymer is contained. For example, the above-mentioned fluorine-containing oxadiazole compound may be contained. That is, the above-mentioned material for optical and electronic parts may be mixture of the fluorine-containing oxadiazole polymer and the fluorine-containing oxadiazole compound. In the case where the materials for optical and electronic parts are a mixture of the fluorine-containing oxadiazole polymer and the fluorine-containing oxadiazole compound, the mixing ratio of both of the polymer and the compound is not especially limited.

The fluorine-containing oxadiazole polymer to be used for the above-mentioned material for optical and electronic parts may comprise other repeating units as long as the repeating unit represented by the above-mentioned formula (14) is essentially comprised, and the repeating unit represented by the above-mentioned formula (14) is preferably a main component of the repeating unit composing the fluorine-containing oxadiazole polymer. Additionally, with respect to the fluorine-containing oxadiazole polymer of the present invention, the structure of the repeating unit represented by the above-mentioned formula (14) may be same or different, and in the case where the polymer is composed of different repeating units, the polymer may be in form of block or random polymer.

With respect to the repeating unit represented by the above-mentioned formula (14), the (—O—$R^2$—O—) part may be bonded to any of carbons at o-, m- or p-position relative to the carbon bonded to the oxadiazole ring of the benzene ring, but the part is preferable to be bonded to the carbon at o- or p-position. In the fluorine-containing oxadiazole polymer of the present invention, some or all of four hydrogen atoms of the fluorine atom-containing benzene ring are replaced with fluorine atoms or the hydrogen atoms of the benzene ring may be replaced with substituent groups other than fluorine atoms. Accordingly, the total of hydrogen atoms, fluorine atoms, and other substituent groups other than fluorine atom in one benzene ring is 4. $R^2$ represents a divalent organic group of 1 to 150 carbon atoms and the divalent organic group is more preferably an organic group of 1 to 50 carbon atoms. A group represented by the above-mentioned formulae (3-1) to (3-18) are more preferable.

As a substituent group in $Y^1$, $Y^2$, $Y^3$, and $Y^4$ in the above-mentioned formulae (3-1) to (3-18), preferable examples are alkyl and alkoxy groups, which each may contain a substituent group, and halogen atoms. More preferable examples are alkyl and alkoxy groups of 1 to 30 carbon atoms, which may contain a substituent group, and halogen atoms. $R^2$ is preferably a group represented by the above-mentioned formulae (8-1) to (8-19).

In the above-mentioned formula (14), the polymerization degree represented by p is preferably in a range of 1 to 5000 and more preferably in a range of 1 to 500.

The material for optical and electronic parts comprising the fluorine-containing oxadiazole polymer represented by the above-mentioned formula (14) can be formed in a film-like form or can be used as a coating agent attributed to excellent solubility of the fluorine-containing oxadiazole polymer in solvents. In the case the material for optical and electronic parts comprising the fluorine-containing oxadiazole polymer represented by the above-mentioned formula (14) is used in form of a film, the thickness is preferably 0.1 µm or more and 1000 µm or less.

The film-like formed product made of the material for optical and electronic parts comprising the fluorine-containing oxadiazole polymer represented by the formula (14) is not only excellent in heat resistance but also in transparency and the film-like formed product is provided with high transmittance by properly selecting the structure and the like of the fluorine-containing oxadiazole polymer.

The material for optical and electronic parts comprising the fluorine-containing oxadiazole polymer represented by the formula (14) also may be used in form of fibrous formed products and various formed bodies.

The material for optical and electronic parts comprising the fluorine-containing oxadiazole polymer represented by the above-mentioned formula (14) may be used in various uses in the optical and electric part fields. Examples of optical uses may include optical communication and recording materials such as optical films used for substrates and optical compensation layer and the like, optical waveguides, materials for communication, optical fibers, optical recording, liquid crystal display and the like. Examples of electronic parts may include, high frequency electronic parts as insulating materials, high frequency wiring substrate, coating agents, low dielectric films, insulating coating films of surface wiring of printed circuit boards, coating materials of semiconductor devices and lead wires, and adhesives. In these uses, the material and the composition are provided with low water absorption property to result in improvement of reliability.

With respect to the transparent resin material comprising the fluorine atom-containing polymer and/or compound as an essential component, following the transparent resin material is also preferable;

the transparent resin material, wherein the fluorine atom-containing compound is a fluorine-containing ester compound represented by the following formula (16):

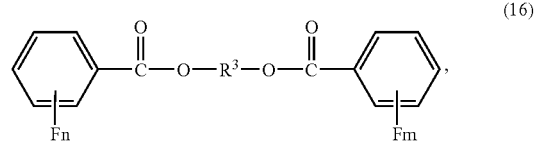

(16)

in the formula, m and n are same or different and each represents the number of fluorine atom bonded to a benzene ring and is an integer of 0 to 5; m+n is 1 or more; $R^3$ represents a divalent organic group having 1 to 150 carbon atoms, and the fluorine atom-containing polymer is a fluorine-containing aryl ester polymer comprising a repeating unit represented by the following formula (17):

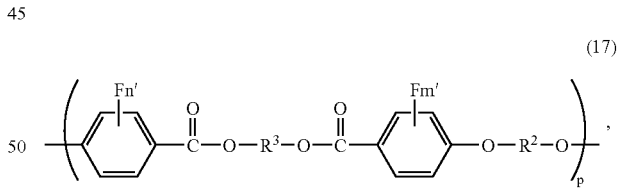

(17)

in the formula, m' and n' are same or different and each represents the number of fluorine atom bonded to a benzene ring and is an integer of 0 to 4; m'+n' is 1 or more; $R^2$ and $R^3$ are same or different and each represents a divalent organic group having 1 to 150 carbon atoms; and p represents a polymerization degree. And one of the present invention is the additive for resin comprising the polymer and/or the compound having the fluorine atom directly bonded to the aromatic ring, wherein the fluorine atom-containing compound is the fluorine-containing ester compound represented by the above-mentioned formula (16), and the fluorine atom-containing polymer is the fluorine-containing aryl ester polymer containing the repeating unit represented by the above-mentioned formula (17).

Such a transparent resin material and an additive for resin will be described below.

In the fluorine-containing ester compound represented by the above-mentioned formula (16), the number of fluorine atoms to be bonded to the benzene ring may be any integer of 1 to 5 and preferably 3 to 5. More preferably it is 5, in other words, fluorine atoms are bonded to all carbon atoms other than the carbon atom having an ester bond among 6 carbon atoms of the benzene ring. The benzene ring may be bonded with other substituent groups such as halogen atoms other than fluorine atom, alkyl chain-containing substituent group, and the like.

In the above-mentioned formula (16), $R^3$ represents a divalent organic group of 1 to 150 carbon atoms and more preferably an organic group of 1 to 50 carbon atoms. Still more preferably the group may be any one of the groups represented by the above-mentioned formulae (3-1) to (3-18). In the $R^3$, $Y^1$, $Y^2$, $Y^3$, and $Y^4$ are same or different and each represents a substituent group and one benzene ring has 0 to 4 substituent groups $Y^1$, $Y^2$, $Y^3$, and $Y^4$. The substituent groups represented by the above-mentioned $Y^1$, $Y^2$, $Y^3$, and $Y^4$ are, for example, alkyl, alkoxy, alkylamino, alkylthio, aryl, aryloxy, arylamino, and arylthio groups, which each may contain a substituent group, and halogen atoms. The substituent groups are preferably alkyl and alkoxy groups, which each has 1 to 30 carbon atoms and each may contain a substituent group, and halogen atoms.

The groups represented by the above-mentioned formulae (3-1) to (3-18) are preferably groups represented by the above-mentioned formulae (8-1) to (8-19).

In the fluorine-containing ester compound represented by the above-mentioned formula (16), the structure represented by $R^3$ is preferable to have a structure represented by the formula (8-3) or (8-12) and have no substituent group in the benzene ring. That is, the fluorine-containing ester compound represented by the above-mentioned formula (16) is preferable to be represented by the following formula (18) or (19).

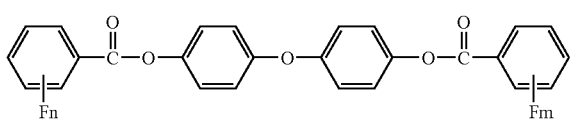

(18)

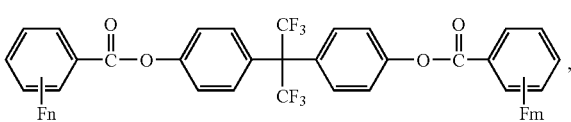

(19)

in the formula, m and n are same or different and each represents the number of fluorine atom bonded to a benzene ring and is an integer of 0 to 5; m+n is 1 or more. When the fluorine-containing ester compound has such a structure, the effects of the present invention are more efficiently exhibited.

The fluorine-containing aryl ester polymer having a repeating unit represented by the above-mentioned formula (17) may other repeating units as long as the polymer essentially comprises the repeating unit represented by the above-mentioned formula (17) and it is more preferable that the repeating unit represented by the above-mentioned formula (17) is a main component of the repeating units composing the fluorine-containing aryl ester polymer. In the fluorine-containing aryl ester polymer having the repeating unit represented by the above-mentioned formula (17), the repeating unit represented by the formula (17) may be same or different. In the case where the polymer is composed of different repeating units, the polymer may be in form of a block or random.

With respect to the repeating unit represented by the following formula (17), the (—O—$R^2$—O—) part may be bonded to any of carbons at o-, m- or p-position relative to the carbon in the benzene ring bonded to next benzene ring by ester bond, but the part is preferable to be bonded to the carbon at o- or p-position. In the fluorine-containing aryl ester polymer of the present invention, some or all of four hydrogen atoms of the fluorine atom-containing benzene ring are replaced with fluorine atoms or the hydrogen atoms of the benzene ring may be replaced with other substituent groups such as halogen atoms other than fluorine atoms and alkyl chain-containing substituent groups. Accordingly, the total of hydrogen atoms, fluorine atoms, halogen atoms other than fluorine atom, and other substituent groups is 4 in benzene ring. $R^2$ and $R^3$ are same or different and each represents a divalent organic group of 1 to 150 carbon atoms. $R^2$ and $R^3$ are more preferably the same as $R^3$ in the above-mentioned formula (16).

In the fluorine-containing aryl ester polymer having the repeating unit represented by the above-mentioned formula (17), the structure represented by $R^3$ is preferable to have a structure represented by the formula (8-3) or (8-12) and have no substituent group in the benzene ring. That is, the fluorine-containing aryl ester polymer having the repeating unit represented by the above-mentioned formula (17) is preferable to comprise a repeating unit represented by the following formula (20):

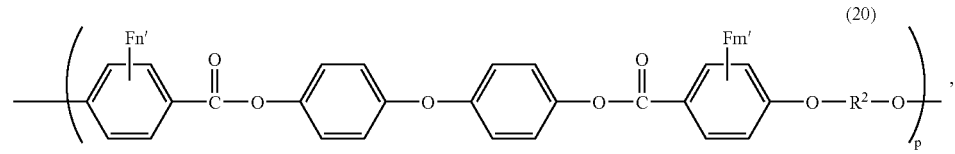

(20)

in the formula, m' and n' are same or different and each represents the number of fluorine atom bonded to a benzene ring and is an integer of 0 to 4; m'+n' is 1 or more; $R^2$ represents a divalent organic group having 1 to 150 carbon atoms; and p represents a polymerization degree, and/or a repeating unit represented by the formula (21):

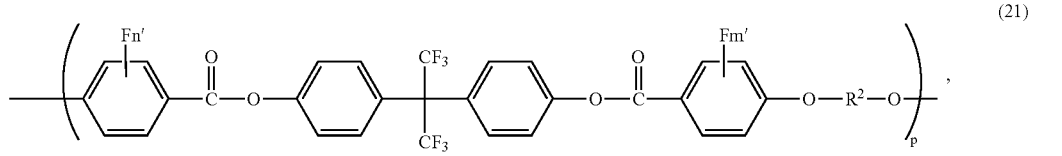

(21)

in the formula, m' and n' are same or different and each represents the number of fluorine atom bonded to a benzene ring and is an integer of 0 to 4; m'+n' is 1 or more; $R^2$ represents a divalent organic group having 1 to 150 carbon atoms; and p represents a polymerization degree. When the fluorine-containing aryl ester polymer has such a structure, the effects of the present invention may be more efficiently exhibited.

The polymerization degree represented by p is preferably in a range of 1 to 5000 and more preferably in a range of 1 to 500.

Since the fluorine-containing aryl ester polymer having the repeating unit represented by the above-mentioned formula (17) has excellent solubility in solvents, the polymer may be used in form of various formed bodies such as film-like and fibrous forms. A formed body comprising the fluorine-containing aryl ester polymer having the repeating unit represented by the above-mentioned formula (17) is also one of the present invention.

The formed body of the present invention may comprise other components as long as it comprises the fluorine-containing aryl ester polymer essentially having the repeating unit represented by the above-mentioned formula (17). In the case where other components are added, the ratio of the fluorine-containing aryl ester polymer is preferably 30% by weight or more and more preferably 50% by weight or more in 100% by weight of the formed body.

The formed body of the present invention may comprise the fluorine-containing ester compound represented by the above-mentioned formula (16). That is, the formed body of the present invention may comprise a mixture of the fluorine-containing aryl ester polymer and the fluorine-containing ester compound. In the case where the formed body of the present invention comprises a mixture of the fluorine-containing aryl ester polymer and the fluorine-containing ester compound, the content ratio of both is not particularly limited and it is preferable that the ratio of the total in both of the polymer and the compound is 30% by weight or more and more preferably 50% by weight or more in 100% by weight of the formed body.

In the case where the formed body of the present invention is used as a film-like formed body such as a film or a sheet, the thickness is preferably 0.1 μm or more and more preferably 1000 μm or less. In the case where it is used as a fibrous formed body, the diameter is preferably 5 μm or more and 10000 μm or less.

Examples of formed bodies in other forms are same as described above. A method of forming the above-mentioned formed bodies may be the same methods as described above.

The formed body containing the fluorine-containing aryl ester polymer having the repeating unit represented by the above-mentioned formula (17) has a high molding processability attributed to the excellent solubility in solvents as described above and in addition to that, the formed body is excellent in heat resistance, low water absorption property, transparency, weathering resistance, and electric property, and therefore the formed body may preferably be used in various fields such as super engineering plastic; electronic information material and precision machine material used as insulating material such as high frequency electronic part, high frequency wiring board, coating agent, low dielectric film, insulating coating film on surface wiring of printed circuit board, semiconductor element, and coating material of lead wire; optical communication and recording material such as optical film used for substrate and optical compensation layer and the like, optical waveguide, communication material, optical fiber, optical recording, and liquid crystal display; and substrate for display. The formed body comprising the fluorine-containing aryl ester polymer having the repeating unit represented by the above-mentioned formula (17) may be used in various forms as described above and in various fields and among them, it is preferable to be used as a film.

When the fluorine-containing ester compound represented by the above-mentioned formula (16) and/or the fluorine-containing aryl ester polymer comprising the repeating unit represented by the formula (17) are added to resin, the water absorption property of the resin is efficiently lowered and a transparent resin material preferably usable in field such as optical communication, optical waveguide, optical recording, liquid crystal display in which resin material with low water absorption property are required may be produced.

The content of the fluorine-containing ester compound represented by the above-mentioned formula (16) and/or the fluorine-containing aryl ester polymer comprising the repeating unit represented by the formula (17) added to the transparent resin material of the present invention is preferably 1% by weight or more and 100% by weight or less in 100% by weight of the resin. It is more preferably 5% by weight or more and 80% by weight or less.

When the content of the fluorine-containing ester compound and/or the fluorine-containing aryl ester polymer is 1% by weight or less, no transparent resin material with sufficiently lowered water absorption property may be produced. In the case where the transparent resin material of the present invention contains both of the fluorine-containing ester compound and the fluorine-containing aryl ester polymer, the content ratio of both is not particularly limited.

The transparent resin material of the present invention may comprise any of the transparent resin described above and preferably ester resin having ester structure such as acrylic resin and polycarbonate resin. The fluorine-containing ester compound or the fluorine-containing aryl ester polymer of the present invention has excellent compatibility with the ester resin attributed to the ester structure existing in the structure and when the transparent resin material comprises the ester resin, the fluorine-containing ester compound and the fluorine-containing aryl ester polymer to the resin may be added at higher ratio to provide a transparent resin material with further lowered water absorption property.

The present invention also provides a transparent resin material comprising the fluorine-containing compound represented by the following formula (22):

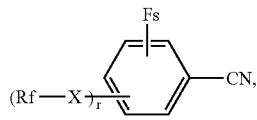
(22)

in the formula, X represents O or S; Rf represents a fluorine-containing alkyl group having 4 or more of carbon atoms; r represents the number of Rf—X— bonded to the aromatic ring and is an integer of 1 or more; s represents the number of fluorine atom bonded to the aromatic ring and is an integer of 1 or more; r+s is an integer of 2 to 5.

Also one of the present invention is an additive for resin comprising a polymer and/or compound having a fluorine atom directly bonded to an aromatic ring, wherein the compound having a fluorine atom is the fluorine-containing compound represented by the above-mentioned formula (22).

In the fluorine-containing compound represented by the above-mentioned formula (22), the fluorine-containing alkyl group means those in which hydrogen atoms bonded to carbon atoms constituting an alkyl group are partially or entirely replaced with fluorine atoms, and the structure is not particularly limited and may be straight, branched, or cyclic alkyl and the number of fluorine atoms bonded to carbon atoms is preferably larger than that of hydrogen atoms bonded to carbon atoms. When the number of fluorine atoms is larger than that of hydrogen atoms, in the case where the above-mentioned fluorine-containing compound is used as an additive for the transparent resin material, the transparent resin material may sufficiently exhibit water repellency. The fluorine-containing compound represented by the formula (22) in which r+s is 5, that is, fluorine atoms or Rf—X— is bonded to all carbon atoms of the aromatic ring is preferable. The case of r=1 and s=4 is more preferable.

One or two or more kinds of the fluorine-containing compound represented by the formula (22) may be added in the case where the compound is added to the transparent resin material.

Examples of the compound where r=1 and s=4 in the formula (22) may include compounds represented by the following formulae (22-1) to (22-6).

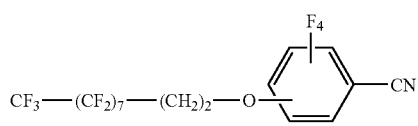
(22-1)

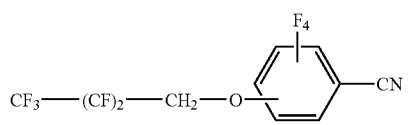
(22-2)

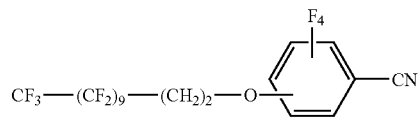
(22-3)

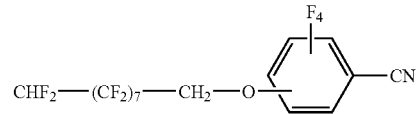
(22-4)

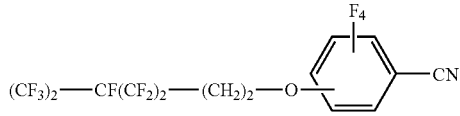
(22-5)

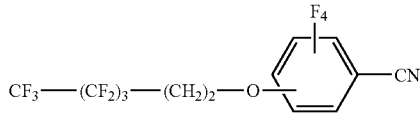
(22-6)

As the fluorine-containing compound represented by the above formula (22), among the fluorine-containing compounds represented by the above formula (22) in which r+s is 5, compound represented by the formula (23) are more preferable.

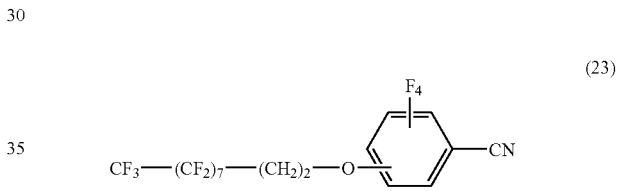
(23)

In the case where the fluorine-containing compound has such a structure, addition of the compound to the transparent resin material may provide the transparent resin material with further lowered water absorption property and more improved water repellency.

When the fluorine-containing compound represented by the above formula (22) is used as an additive for the transparent resin material, not only the transparent resin is provided with further lowered water absorption property and improved water repellency attributed to the excellent water repellency of fluorine atom but also the refractive index of the transparent resin material may be changed depending on the content of the additive without deteriorating the various properties such as thermal properties by properly setting the content of the fluorine-containing compound.

In the case where the fluorine-containing compound represented by the formula (22) is used as an additive for the transparent resin material, the compound is preferable to be added in a ratio of 1 to 100% by weight to the transparent resin contained in the transparent resin material. When it is less than 1% by weight, the transparent resin material may be provided with insufficient low water absorption property and water repellency. When it exceeds 100% by weight, the basic properties such as transparency and mechanical strength may be insufficiently exhibited. The lower limit is preferably 5% by weight and more preferably 10% by weight. The upper limit is preferably 80% by weight and more preferably 70% by weight.

As the formed product, a fiber, a formed body, a thick film and the like are preferable.

As the method of forming the formed product, the methods exemplified above may be employed.

As the transparent resin, the above exemplified transparent resin may be used.

The transparent resin material of the present invention may be preferably used for various applications such as optical film used for a substrate, an antireflective layer, a reflective index controlling layer and an optical compensation layer; optical communication material such as optical fiber, optical waveguide, and optical switch; and recording material such as optical recording disk; substrate for display such as an liquid crystal display device, plasma display device, digital paper, Organic Electro Luminescence, Inorganic Electro Luminescence, and rear-projection. The transparent resin material of the present invention may be used for, for example, lens such as an optical pickup lens, an fθ lens for laser beam printer, a lens for glass, a camera lens, a video camera lens, and a lamp lens; disk such as a video disk, an audio disk, and a re-writable disk for computer; and optical transmission material such as a plastic optical fiber (POF), an optical connector, and a photoconductor. An optical fiber, an optical waveguide, an optical recording disk, an optical film, or a substrate for display made of material comprising the transparent resin material of the present invention is also one of preferable embodiments of the present invention.

The transparent resin material of the present invention has the above-mentioned constitution and is capable of lowering the water absorption property of a transparent resin without deteriorating various properties such as transparency and thermal properties and of controlling the refractive index. Furthermore, the material has the improved heat resistance and suppresses optical loss, and therefore the transparent resin material may be preferably used for various applications such as optical communication, optical waveguide, optical recording, liquid crystal display and the like.

Also the material for optical and electronic parts containing the fluorine-containing oxadiazole compound of the present invention has the above-mentioned constitution, and since the material for optical and electronic parts is excellent in the transparency, heat resistance, water repellency, and electrochemical properties and the like, and the fluorine-containing oxadiazole compound is also excellent in the solubility in solvents, the material may be used in various forms such as a film and a coating agent in optical and electronic part fields. Furthermore, since addition of the fluorine-containing oxadiazole compound to resin provides the resin with sufficiently lowered water absorption property, the fluorine-containing oxadiazole compound may be used preferably as an additive for resin.

In addition, the fluorine-containing ester compound and fluorine-containing aryl ester polymer of the present invention have the above-mentioned constitution and are excellent in low water absorption property and weathering resistance. The polymer is excellent in various properties such as heat resistance, weathering resistance, electric properties, and transparency, and therefore the fluorine-containing ester compound and fluorine-containing aryl ester polymer of the present invention may be preferably used in various fields such as an electronic information material, a precision machine material, and an optical material. Furthermore, addition of the fluorine-containing ester compound and/or the fluorine-containing aryl ester polymer of the present invention to resin provides the resin with sufficiently lowered water absorption property and gives a transparent resin material preferably usable in fields such as optical communication, optical waveguide, optical recording, liquid crystal display in which the material having lowered water absorption is required.

Furthermore, the fluorine-containing compound of the present invention has the above-mentioned constitution and in the case where, for example, the compound is used as an additive for the transparent resin material, the compound can lower the water absorption property of the transparent resin material and provide water repellency to the transparent resin material without deteriorating the various properties such as transparency of the transparent resin. Furthermore, it is expected that addition of the fluorine-containing compound of the present invention to a resin may give the effect such as lowering the refractive index and dielectric constant of the resin, which are effects generally given by a compound containing fluorine atom.

BEST MODES FOR CARRYING OUT THE INVENTION

The present invention will, hereinafter, be described in more detail with reference to Examples, but the present invention is not be unduly limited to Examples. In addition, "part" represents "part by weight" and "%" represents "% by mass" in the following paragraph unless otherwise specified.

Synthesis Example 1

Synthesis of polymer (BPDE-6FBA) comprising 4,4'-bis(2,3,4,5,6-pentafluorobenzoyl)diphenyl ether (BPDE) and 2,2-bis(pentafluorobenzoyloxyphenyl)-1,1,1,3,3,3-hexafluoropropane (6FBA)

BPDE 41.85 g (75 mmol), 6 FBA 25.20 g (75 mmol), potassium carbonate 51.83 g (375 mmol), a molecular sieve 31 g and methyl ethyl ketone (MEK) 310 g were charged and reacted at 75° C. for 3 hours. After that, the reaction solution was added to 1,300 mL of deionized water to produce (BPDE-6FBA). The produced polymer comprised the following repeating unit.

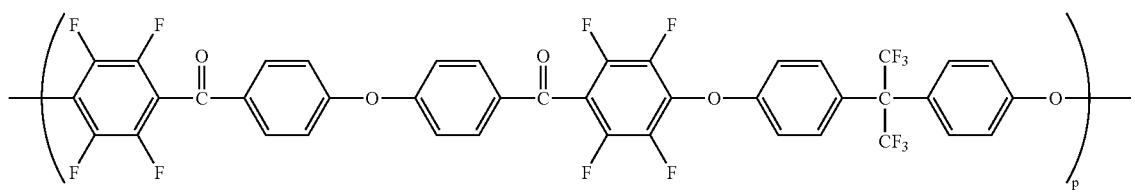

Synthesis Example 2

Synthesis of polymer (PTFBN-HF) comprising 4-phenoxy-2,3,5,6-tetrafluorobenzonitrile (PTFBN) and fluorene-9-bisphenyl (HF)

PTFBN 13.36 g (50 mmol), HF 17.52 g (50 mmol), potassium carbonate 34.55 g (250 mmol), a molecular sieve 10 g and MEK 70 g were charged and reacted at 80° C. for 5 hours. After that, the reaction solution was added to 250 mL of deionized water to produce (PTFBN-HF). The produced polymer comprised the following repeating unit.

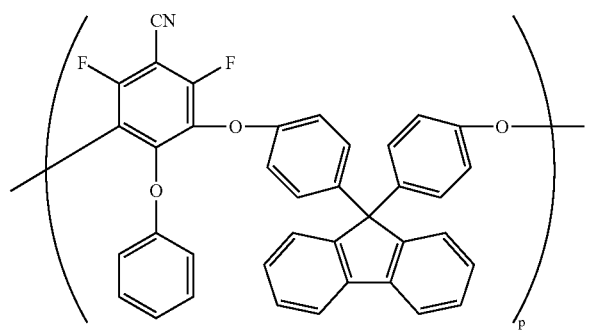

Synthesis Example 3

Synthesis of (PTFBN-6FBA)

PTFBN 13.36 g (50 mmol), 6FBA 16.81 g (50 mmol), potassium carbonate 34.55 g (250 mmol), a molecular sieve 10 g and MEK 70 g were charged and reacted at 80° C. for 2 hours. After that, the reaction solution was added to 250 mL of deionized water to produce (PTFBN-6FBA). The produced polymer comprised the following repeating unit.

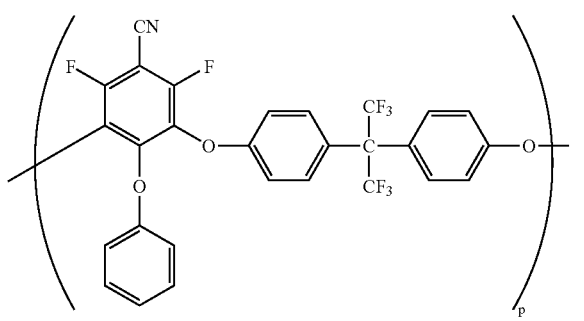

Example 1

Poly(methyl methacrylate) (PMMA), which is a pellet-like transparent resin, and 4,4'-bis(2,3,4,5,6-pentafluorobenzoyl)diphenyl ether (BPDE), which is a powder-like aromatic fluorine-containing compound, were respectively dissolved in chloroform to make solutions and they were mixed to produce a transparent resin material. The transparent resin material was formed to produce a film. The transparent resin material was not deteriorated in transparency and maintained excellent transparency even after film formation. Independently of addition of an additive, a film and a formed product with excellent quality could be produced and the molding processability was not deteriorated. BPDE is a compound having the following structure.

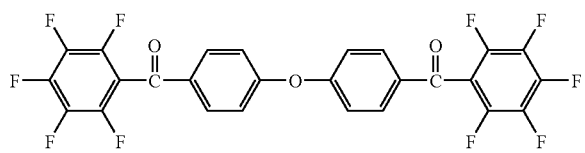

Example 2

A film of a transparent resin material was produced in the same manner as in Example 1, except that bis(pentafluorophenyl)sulfide (10F-sulfide) was used in place of BPDE as the aromatic fluorine-containing compound. 10F-sulfide is a compound having the following structure.

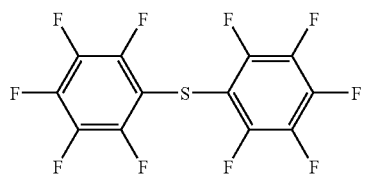

Example 3

A film of a transparent resin material was produced in the same manner as in Example 1, except that bis(pentafluorophenyl)sulfone (10F-sulfone) was used in place of BPDE as the aromatic fluorine-containing compound. 10F-sulfone is a compound having the following structure.

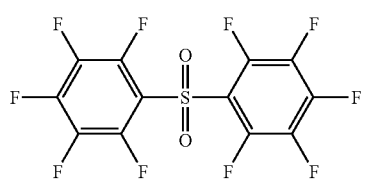

Example 4

A film of a transparent resin material was produced in the same manner as in Example 1, except that 4-phenoxy-2,3,5,6,-tetrafluorobenzonitrile (PhO-TFBN) was used in place of BPDE as the aromatic fluorine-containing compound. PhO-TFBN is a compound having the following structure.

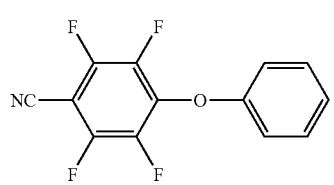

Examples 5 to 7

Films of transparent resin materials were produced in the same manner as in Example 1, except that three kinds of the aromatic fluorine-containing polymers synthesized in the above-mentioned Synthesis Examples 1 to 3 (BPDE-6FBA, PTFBN-HF, and PTFBN-6FBA) were used in place of BPDE as the aromatic fluorine-containing compound.

The films produced in Examples 1 to 7 were measured for water absorption, refractive index, and total luminous transmittance and evaluated for thermal property by the following methods. The results are shown in Table 1 to 4, respectively. With respect to samples of Examples 2 to 7 measured for water absorption and samples of Examples 1 to 7 measured for refractive index, measurements were carried out for samples in which 30% by weight, relative to PMMA, of aromatic fluorine-containing compound or aromatic fluorine-containing polymer was added to PMMA and 50% by weight, relative to PMMA, of aromatic fluorine-containing compound or aromatic fluorine-containing polymer was added to PMMA. With respect to samples of Examples 1 to 7 measured for thermal property evaluation and total luminous transmittance, films in which 50% by weight, relative to PMMA, of each aromatic fluorine-containing compound or aromatic fluorine-containing polymer was added to PMMA as samples. In the respective measurements, PMMA alone was measured for comparison. In water absorption measurement, PMMA sample containing 0% by weight was used as the sample of PMMA alone.

[Water Absorption]

After each produced film was dried at 110° C. for 15 hours and then immersed in water at 25° C. for 48 hours, the weight alteration was measured to calculate water absorption ratio.

[Thermal Property Evaluation]

Using Shimadzu Simultaneous TG/DTA Instrument (manufactured by Shimadzu Corporation), the glass transition on-set (starting temperature of the glass transition) and decomposition temperature (the temperature at weight decrease of 5% by weight and temperature at weight decrease of 10% by weight) were measured. The heating rate was at 10° C./min under nitrogen atmosphere.

[Refractive Index Measurement]

Using Prism Coupler SPA-4000 (manufactured by SAIRON TECHNOLOGY), the refractive index was measured.

[Total Luminous Transmittance Measurement]

Colorimetry color difference meter NDH-1001 DP model (manufactured by Nippon Denshoku Kogyo Co., Ltd.) was used for the measurement.

TABLE 1

|  |  | Addition amount relative to PMMA | | | | | |
|---|---|---|---|---|---|---|---|
|  |  | 0% by weight | 10% by weight | 20% by weight | 30% by weight | 40% by weight | 50% by weight |
| Example 1 | PMMA + BPDE | 1.15 | 0.95 | 0.75 | 0.68 | 0.48 | 0.40 |
| Example 2 | PMMA + 10F-sulfide | 1.15 | — | — | 0.82 | — | 0.44 |
| Example 3 | PMMA + 10F-sulfone | 1.15 | — | — | 0.65 | — | 0.47 |
| Example 4 | PMMA + PhO-TFBN | 1.15 | — | — | 0.69 | — | 0.68 |
| Example 5 | PMMA + BPDE-6FBA | 1.15 | — | — | 0.54 | — | 0.24 |
| Example 6 | PMMA + PTFBN-HF | 1.15 | — | — | 0.70 | — | 0.61 |
| Example 7 | PMMA + PTFBN-6FBA | 1.15 | — | — | 0.61 | — | 0.33 |

TABLE 2

|  |  | 5% by weight loss | 10% by weight loss | Glass transition on-set |
|---|---|---|---|---|
| Example 1 | PMMA + BPDE | 297 | 308 | 120 |
| Example 2 | PMMA + 10F-sulfide | 205 | 237 | 84 |
| Example 3 | PMMA + 10F-sulfone | 222 | 305 | 94 |
| Example 4 | PMMA + PhO-TFBN | 211 | 302 | 89 |
| Example 5 | PMMA + BPDE-6FBA | 275 | 288 | 104 |
| Example 6 | PMMA + PTFBN-HF | 324 | 338 | 116 |
| Example 7 | PMMA + PTFBN-6FBA | 350 | 357 | 123 |
| Comparative Example 1 | PMMA alone | 300 | 308 | 120 |

TABLE 3

| | | Addition amount relative to PMMA | | | | | | |
|---|---|---|---|---|---|---|---|---|
| | | Comparative Example 1 | Example 1 PMMA + BPDE | | Example 2 PMMA + 10F-sulfide | | Example 3 PMMA + 10F-sulfone | |
| | | PMMA alone | 30% by weight | 50% by weight | 30% by weight | 50% by weight | 30% by weight | 50% by weight |
| Measured wavelength | 632.8 nm | 1.4903 | 1.5009 | 1.5114 | 1.4901 | 1.4894 | 1.4891 | 1.4896 |
| | 830 nm | 1.4857 | 1.4978 | 1.5041 | 1.4846 | 1.4811 | 1.4841 | 1.4842 |
| | 1310 nm | 1.4815 | 1.4921 | 1.4980 | 1.4791 | 1.4772 | 1.4795 | 1.4794 |
| | 1550 nm | 1.4804 | 1.4906 | 1.4966 | 1.4788 | 1.4764 | 1.4785 | 1.4785 |

| | | Addition amount relative to PMMA | | | | | | |
|---|---|---|---|---|---|---|---|---|
| | | Example 4 PMMA + PhO-TFBN | | Example 5 PMMA + BPDE-6FBA | | Example 6 PMMA + PTFBN-HF | | Example 7 PMMA + PTFBN-6FBA | |
| | | 30% by weight | 50% by weight | 30% by weight | 50% by weight | 30% by weight | 50% by weight | 30% by weight | 50% by weight |
| Measured wavelength | 632.8 nm | 1.4965 | 1.4999 | 1.5003 | 1.5047 | 1.5192 | 1.5308 | 1.5028 | 1.5083 |
| | 830 nm | 1.4906 | 1.4918 | 1.4974 | 1.5026 | 1.5173 | 1.5300 | 1.4968 | 1.5017 |
| | 1310 nm | 1.4859 | 1.4897 | 1.4913 | 1.4956 | 1.5117 | 1.5238 | 1.4917 | 1.4963 |
| | 1550 nm | 1.4851 | 1.4896 | 1.4901 | 1.4944 | 1.5101 | 1.5221 | 1.4902 | 1.4946 |

TABLE 4

|  |  | Transmittance(%) |
|---|---|---|
| Example 1 | PMMA + BPDE | 92.4 |
| Example 2 | PMMA + 10F-sulfide | 92.2 |
| Example 3 | PMMA + 10F-sulfone | 91.6 |
| Example 4 | PMMA + PhO-TFBN | 92.2 |
| Example 5 | PMMA + BPDE-6FBA | 92.2 |
| Example 6 | PMMA + PTFBN-HF | 91.8 |
| Example 7 | PMMA + PTFBN-6FBA | 92.1 |
| Comparative Example 1 | PMMA alone | 92.6 |

In Tables 1 to 4, the addition amount relative to PMMA is the addition amount of each aromatic fluorine-containing compound or aromatic fluorine-containing polymer to PMMA. The 5% by weight loss and 10% by weight loss mean the temperature at weight decrease of 5% by weight and temperature at weight decrease of 10% by weight, respectively.

Synthesis Example 4

Synthesis of di(perfluorobenzoyl)hydrazide (10F-BH)

Perfluorobenzoylchloride (PFBC) 23.5 g (102 mmol) and N-methyl-2-pyrrolidinone (NMP) 100 mL were charged into a 250 mL flask equipped with a dropping funnel and a nitrogen gas inlet tube. The flask was cooled to −10° C. and $N_2H_4 \cdot H_2O$ 2.6 g (52 mmol) was dropwise added slowly to the flask under stirring condition. On completion of the dropping addition, the mixture was reacted at −10° C. for 6 hours. Next, the reaction mixture was added to excess water, filtered, and dried. The obtained product was recrystallized twice using methanol and water to produce a white crystal of 10F-BH (yield 63.4%). The melting point of 10F-BH was 270.3° C.

Synthesis Example 5
Synthesis of di(perfluorooxadiazole) (10F-oxadiazole)

A 250 mL flask equipped with a reflux condenser was charged with 10F-BH 8.4 g (36.4 mmol), thionyl chloride 200 g, and pyridine 0.8 g and the mixture was refluxed for 3 hours under nitrogen current. After excess thionyl chloride was removed by distillation, the product was dried under reduced pressure for 3 hours. The obtained product was recrystallized using methanol to produce a white crystal of 10F-oxadiazole (yield 41.6%). The melting point of 10F-oxadiazole was 161.4° C.

Synthesis Example 6
Synthesis of a condensation polymer (8F-PO (6FBA)) of di(perfluorooxadiazole) (10F-oxadiazole) and hexafluorobisphenol A (6FBA)

A 50 mL flask equipped with a Dean-Stark trap containing toluene 1.5 g and a reflux condenser was charged with 6FBA 0.17 g (0.51 mmol), potassium carbonate 0.071 g (0.51 mmol) and NMP 1.5 g. The mixture was refluxed at 150° C. for 3 hours under nitrogen atmosphere and then dewatered and then toluene was removed by distillation. The product was cooled to 30° C. and mixed with 10F-oxadiazole 0.22 g (0.55 mmol). While being kept at 30° C., the mixture was reacted for 2 hours. On completion of the reaction, the reaction solution was cooled and while the reaction solution being fiercely stirred by a blender, water was added. The precipitated condensation polymer was separated by filtration and washed with distilled water and methanol and then, dried under reduced pressure. The produced condensation polymer was represented by the following formula.

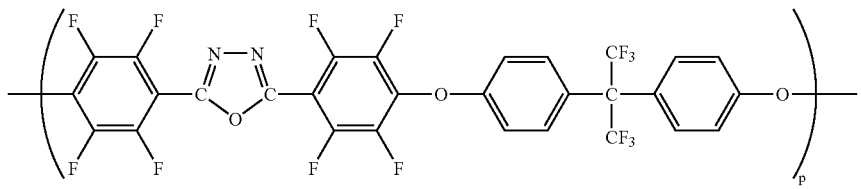

The measurement results of yield and number average molecular weight are shown in Table 5.

The evaluation results of respective properties such as solubility in the respective solvents and the thermal property (glass transition temperature (Tg)), transmittance (transparency), water absorption ratio, and dielectric constant of the produced 8F-PO are shown in Table 6 to Table 11. The evaluation methods of the respective properties are as follows. In Table 6, DMAc stands for dimethylacetamide and THF stands for tetrahydrofuran.

TABLE 5

| Polymer | Yield (%) | Number average molecular weight |
|---|---|---|
| 8F-PO (6FBA) | 95.0 | 22600 |

TABLE 6

| Polymer | NMP | DMAc | THF | CHCl$_3$ | Toluene |
|---|---|---|---|---|---|
| 8F-PO (6FBA) | + | + | + | + | + − |

TABLE 7

| Polymer | Tg(° C.) |
|---|---|
| 8F-PO (6FBA) | 196 |

TABLE 8

| Polymer | Measured wavelength(nm) | Trancemittance(%) |
|---|---|---|
| 8F-PO (6FBA) | 850 | 89.5 |

TABLE 9

| Polymer | Total luminous transmittance(%) |
|---|---|
| 8F-PO (6FBA) | 89.0 |

TABLE 10

| Polymer | Water absorption ratio(%) |
|---|---|
| 8F-PO (6FBA) | Less than 0.05 |

TABLE 11

| Polymer | Measured frequency(Hz) | Dielectric constant |
|---|---|---|
| 8F-PO (6FBA) | 1000000 | 3.2 |

Examples 8 and 9 and Comparative Example 2

Lowering of Water Absorption Property of Polymethyl Methacrylate (PMMA)

Polymethyl methacrylate (PMMA), which is a pellet-like transparent resin, and 10F-oxadiazole and 8F-PO (6FBA), which are additives for resin, were independently dissolved in chloroform to make solutions and three kinds of transparent resin materials; mixture of PMMA and 10F-oxadiazole (10F-oxadiazole/PMMA); PMMA and 8F-PO (6FBA) (8F-PO (6FBA)/PMMA); and PMMA alone, were produced and these transparent resin materials were formed to produce films. These transparent resin materials were not deteriorated in transparency and maintained excellent transparency even after film formation. Independently of addition of an additive, films and formed products with excellent quality could be produced and the forming-processability was not deteriorated.

The respective transparent resin materials were measured for water absorption ratio. The measurement method is as described below. Measurement was carried out for samples in which 30% by weight, relative to PMMA, of 10F-oxadiazole or 8F-PO (6FBA) was added to PMMA and 50% by weight, relative to PMMA, of 10F-oxadiazole or 8F-PO (6FBA) was added to PMMA. The results are shown in Table 12.

TABLE 12

|  |  | Addition amount (% by weight) relative to PMMA | Water absorption ratio(%) |
|---|---|---|---|
| Example 8 | PMMA/10F-oxadiazole | 30 | 0.62 |
|  |  | 50 | 0.49 |
| Example 9 | PMMA/8F-PO (6FBA) | 30 | 0.55 |
|  |  | 50 | 0.41 |
| Comparative Example 2 | PMMA alone | 0 | 1.13 |

[Measurement of Number Average Molecular Weight]

Using HLC-8120 GPC (manufactured by Tosoh Corporation) and column: G-5000HXL+GMHXL-L, the measurement was carried out. THF was used as a development solvent at 1 mL/min flow rate and polystyrene was used as standard and the number average molecular weight was measured by polystyrene conversion.

[Measurement of Solubility]

Each solvent 3 mL at 25° C. was mixed with 8F-PO (6FBA) 0.1 g and stirred for 10 minutes to measure the solubility. The evaluation standards were as follows.

+: dissolved

+−: partially dissolved

[Thermal Property Evaluation]

Using a differential scanning calorimeter (DSC-7) manufactured by Perkin Elmer, the thermal property evaluation was carried out by measuring the glass transition temperature (Tg) at 20° C./min under nitrogen atmosphere.

[Measurement of Transmittance (Transparency)]

Using Shimadzu UV-3100 (manufactured by Shimadzu Corporation), the transmittance at 850 nm was measured. The materials in form of 30 μm films were used for the measurement.

[Measurement of Total Luminous Transmittance] [Water Absorption Measurement]

Measurements were carried out in the same methods as in Examples 1 to 7.

[Measurement of Dielectric Constant]

The dielectric constant was measured using Impedance Analyzer HP 4294A8 (manufactured by HEWLETT PACKARD Co., Ltd.)

Synthesis Example 7

Synthesis of 4,4'-bis(2,3,4,5,6-pentafluorobenzoyloxy)diphenyl ether (BPDES)

4,4'-Hydoxydiphenyl ether 5.00 g (24.75 mmol), triethylamine 5.01 g (49.50 mmol), and dichloromethane 100 g were charged into a flask and kept at 10° C. in a water bath. Pentafluorobenzoyl chloride 11.41 g (49.50 mmol) and dichloromethane 20 g were added to a dropping funnel and dropwise added slowly to the flask.

On completion of the dropping addition, the water bath was taken out, the mixture was reacted at a room temperature for 3 hours. After the reaction, the mixture was added to water and the produced solid was recovered and recrystallized with methanol to obtain BPDES. The yield was 86.0% and the melting point Tm was 130° C.

Synthesis Example 8

Synthesis of 2,2-bis(pentafluorobenzoyloxyphenyl)-1,1,1,3,3,3-hexafluoropropane (BP6FBA)

Using 2,2'-bis(4-hydroxyphenyl)hexafluoropropane 5.00 g (14.88 mmol), triethylamine 3.31 g (32.74 mmol), and pentafluorobenzoyl chloride 6.86 g (29.76 mmol) were used and synthesis was carried out in the same manner as in Synthesis example 7 to obtain BP6FBA. The yield was 80.7% and the melting point Tm was 119° C.

Synthesis Example 9

Synthesis of polymer (BPDES-HF) comprising BPDES and fluorene-9-bisphenol (HF)

BPDES 6.04 g (10.23 mmol), HF 3.59 g (10.23 mmol), potassium carbonate 7.07 g (51.16 mmol), a molecular sieve 10.00 g and MEK 100 g were charged and reacted at 75° C. for 2 hours. After that, the reaction solution was added to 0.5 L of deionized water to obtain a polymer (BPDES-HF). The yield of the polymer was 90%. The produced polymer had a number average molecular weight of 15400. The polymer was also evaluated for thermal property and measured for transmittance. The results are shown in Tables 13 and 14. The measurement of number average molecular weight, thermal property evaluation, and transmittance measurement were carried out by the following methods.

Synthesis Example 10

Synthesis of polymer (BPDES-6FBA) comprising BPDES and hexafluorobisphenol A (6FBA)

BPDES 3.00 g (5.08 mmol), 6FBA 1.70 g (5.08 mmol), potassium carbonate 3.51 g (25.40 mmol), a molecular sieve 10.00 g and methyl ethyl ketone (MEK) 100 g were charged and reacted at 75° C. for 2 hours. After that, the reaction solution was added to 0.5 L of deionized water to obtain a polymer. The yield of the polymer was 82%. The produced polymer had a number average molecular weight 13000. The polymer was also evaluated for thermal property and measured for transmittance. The results are shown in Tables 13 and 14.

Synthesis Example 11

Synthesis of polymer (BP6FBA-6FBA) comprising BP6FBA and 6FBA

BP6FBA 3.00 g (4.14 mmol), 6FBA 1.39 g (4.14 mmol), potassium carbonate 2.86 g (20.70 mmol), a molecular sieve 10.00 g and MEK 100 g were charged and reacted at 75° C. for 2 hours. After that, the reaction solution was added to 0.5 L of deionized water to obtain a polymer. The yield of the polymer was 85%. The produced polymer had a number average molecular weight 16100. The polymer was also evaluated for thermal property and measured for transmittance. The results are shown in Tables 13 and 14.

TABLE 13

| | Glass transition temperature(° C.) | 5% by weight loss(° C.) |
|---|---|---|
| Synthesis Example 9 | 214 | 470 |
| Synthesis Example 10 | 181 | 458 |
| Synthesis Example 11 | 175 | 459 |

TABLE 14

| | Transmittance (850 nm)(%) |
|---|---|
| Synthesis Example 9 | 89.8 |
| Synthesis Example 10 | 90.1 |
| Synthesis Example 11 | 90.8 |

Examples 10 to 14 and Comparative Example 3

1 g each of the compounds synthesized in Synthesis Examples 7 to 11 was added to polymethyl methacrylate (PMMA) 2 g dissolved in toluene 18 g. Each mixture was cast on a glass plate and dried to obtain a film. Each film was evaluated for thermal property and measured for refractive index, and water absorption ratio. The results are shown in Tables 15 to 17. For comparison, PMMA alone was also measured. Thermal property evaluation, refractive index measurement, and water absorption measurement were carried out in the same manner as in Examples 1 to 7.

TABLE 15

| | | 5% by weight loss(° C.) | Glass transmitton on-set (° C.) |
|---|---|---|---|
| Example 10 | PMMA/BPDES | 296 | 104 |
| Example 11 | PMMA/BP6FBA | 304 | 101 |
| Example 12 | PMMA/BPDES-HF | 350 | 123 |
| Example 13 | PMMA/BPDES-6FBA | 347 | 117 |
| Example 14 | PMMA/BP6FBA-6FBA | 330 | 110 |
| Comparative Example 3 | PMMA alone | 300 | 120 |

TABLE 16

| | | 632.8 nm | 830 nm | 1310 nm | 1550 nm |
|---|---|---|---|---|---|
| Example 10 | PMMA/BPDES | 1.4992 | 1.4971 | 1.4863 | 1.4813 |
| Example 11 | PMMA/BP6FBA | 1.4888 | 1.4836 | 1.4770 | 1.4722 |
| Example 12 | PMMA/BPDES-HF | 1.5264 | 1.5189 | 1.5129 | 1.5105 |
| Example 13 | PMMA/BPDES-6FBA | 1.5053 | 1.4993 | 1.4931 | 1.4914 |
| Example 14 | PMMA/BP6FBA-6FBA | 1.4947 | 1.4893 | 1.4839 | 1.4825 |
| Comparative Example 3 | PMMA alone | 1.4903 | 1.4857 | 1.4815 | 1.4804 |

TABLE 17

| | | Water absorption ratio(%) |
|---|---|---|
| Example 10 | PMMA/BPDES | 0.79 |
| Example 11 | PMMA/BP6FBA | 0.23 |
| Example 12 | PMMA/BPDES-HF | 0.45 |
| Example 13 | PMMA/BPDES-6FBA | 0.38 |
| Example 14 | PMMA/BP6FBA-6FBA | 0.26 |
| Comparative Example 3 | PMMA alone | 1.15 |

[Number Average Molecular Weight] [Transmittance Measurement]

Measurements were carried out by the same methods employed for 8F-PO (6FBA) of Synthesis Example 3.

Synthesis Example 12

Synthesis of heptadecafluorodecanoxytetrafluorobenzonitrile (17FD-TFBN)

Pentafluorobenzonitrile (PFBN) 5.66 g (29.31 mmol), heptadecafluorodecanol 9.28 g (19.99 mmol), potassium carbonate 1.45 g (10.49 mmol), and acetonitrile 50 g were all together charged into a reaction vessel. The reaction solution was heated at 70° C. for 24 hours and then cooled. On completion of the reaction, the precipitated salt was filtered and then the solvent was removed by distillation, the obtained crude product was distilled under reduced pressure in condition of 113 to 118° C./0.1 mmHg to obtain a white solid 8.92 g (yield 70%). The obtained product was mixture of heptadecafluorodecanoxy-2,3,5,6-tetrafluorobenzonitrile (p-isomer)/heptadecafluorodecanoxy-3,4,5,6-tetrafluorobenzonitrile (o-isomer)=87.7/12.3. The obtained 17FD-TFBN was evaluated for thermal property. The results are shown in Table 18. The measurement apparatus and conditions for the thermal property evaluation were as follows.

[Thermal Property Evaluation]

Using Shimadzu Simultaneous TG/DTA Instrument (manufactured by Shimadzu Corporation), decomposition temperature (the temperature at weight decrease of 2% by weight) was measured. The heating rate was at 10° C./min under nitrogen atmosphere.

TABLE 18

| | 17FD-TFBN |
|---|---|
| Temperature at weight decrease of 2% by weight | 170° C. |

Example 15 and Comparative Example 4

0.9 part of the substance 17FD-TFBN (mixture of p-isomer and o-isomer) produced in Synthesis Example 12 was dissolved in acrylic resin A (methyl methacrylate (MMA)/tert-butyl methacrylate (tBMA)/FM 108=60/30/10; solvent: methyl ethyl ketone (MEK)/toluene; solid matter 30%, FM 108: fluorine-containing methacrylic acid derivative, manufactured by Kyoeisha Chemical Co., Ltd.) 10 part to obtain a transparent resin material.

A film was produced by casting the material on PET by using the casting method and by separating the formed film.

The film was not deteriorated in transparency and maintained excellent transparency. The film was measured for total luminous transmittance, haze, and water absorption ratio. The results are shown in Table 19. The measurement apparatuses and the conditions for total luminous transmittance, haze, and water absorption ratio measurements were as follows.

[Total Luminous Transmittance, Haze]

Colorimetry color difference meter NDH-1001 DP model (manufactured by Nippon Denshoku Kogyo Co., Ltd.) was employed for the measurement.

Measurements for total luminous transmittance and haze were carried out with 50 μm-thick films produced by the same manner as in Example 1.

[Water Absorption Ratio]

The films produced by the same manner as in Example 1 were immersed in water at 25° C. for 72 hours and the weight alteration was measured to calculate water absorption ratio.

TABLE 19

|  | Example 15 | Comparative Example 4 |
| --- | --- | --- |
| Film | Film of acrylic resin A + 17FD-TFBN | Film of acrylic resin A |
| Total luminous transmittance (%) | 93.6 | 93.6 |
| Haze (%) | 0.6 | 0.5 |
| Water absorption ratio (%) | 0.55 | 0.90 |

From the experiment results of Examples 1 to 7 and Comparative Example 1, the water absorption ratio was lowered when the aromatic fluorine-containing compound of the present invention represented by the formula (1) or (11) or the aromatic fluorine-containing polymer of the present invention comprising the repeating unit represented by the formula (12) or the repeating unit represented by the formula (13) was added. And, even if the aromatic fluorine-containing compound or the aromatic fluorine-containing polymer was added, the glass transition temperature and the decomposition temperature of the transparent resin were hardly lowered. Furthermore, the refractive index was found precisely controllable.

From the experiment results of Examples 8 and 9 and Comparative Example 2, it was confirmed that the water absorption of the transparent resin material could efficiently be lowered when an additive for resin containing a polymer comprising a fluorine-containing oxadiazole structure unit represented by the formula (14) of the present invention or a fluorine-containing oxadiazole compound represented by the formula (15) was added to the transparent resin material.

Furthermore, from the experiment results of Examples 10 to 14 and Comparative Example 3, it was confirmed that a fluorine-containing fluoroaryl ester polymer of the present invention comprising a repeating unit represented by the formula (17) has a high heat resistance and transparency. Also, it was confirmed that when a fluorine-containing ester compound of the present invention represented by the formula (16) or a fluorine-containing aryl ester polymer comprising the repeating unit represented by the formula (17) was added to resin, reflective index of the resin could be effectively controlled and also the water absorption was effectively lowered. And the heat resistance was hardly lowered.

In addition, from the experiment results of Example 15 and Comparative Example 4, it was confirmed that when a fluorine-containing compound of the present invention represented by the formula (22) was added to a transparent resin material, the water absorption property could efficiently be lowered without deteriorating the transparency of the transparent resin material.

The present application claims priority under 35 U.S.C. §119 to Japanese Patent Application No. 2004-160154, filed May 28, 2004, entitled "TRANSPARENT RESIN MATERIAL", Japanese Patent Application No. 2004-234514, filed Aug. 11, 2004, entitled "TRANSPARENT RESIN MATERIAL", Japanese Patent Application No. 2004-344273, filed Nov. 29, 2004, entitled "OPTICAL AND ELECTRICAL PARTS MATERIAL USING FLUORINE-CONTAINING OXADIZOLE COMPOUND", Japanese Patent Application No. 2004-349160, filed Dec. 1, 2004, entitled "FLUORINE-CONTAINING ESTER COMPOUND, FLUORINE-CONTAINING ARYL ESTER POLYMER AND PRODUCTION METHOD THEREOF AND RESIN COMPOSITION COMPRISING THEREOF", and Japanese Patent Application No. 2004-226815, filed Aug. 3, 2004, entitled "FLUORINE-CONTAINING COMPOUND".

What is claimed as new and desired to be protected by Letters Patent of the United States is:

1. A transparent material containing a mixture of 1) a resin capable of forming a formed product having transparency, and 2) a fluorine atom-containing compound, which is represented by the following formula (1):

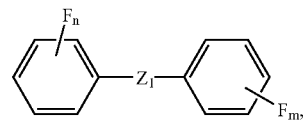

(1)

in the formula, $Z^1$ represents a divalent organic group or a direct bond between benzene rings; n and m each represents an integer of 0 to 5; n+m is 1 or more; a hydrogen atom in the benzene ring may be replaced with a substituent group other than a fluorine atom, wherein the transparent material contains 0.3 to 35% by weight of a fluorine atom in 100% by weight of the formed product, and wherein the transparent material contains a ratio of 1 to 100 parts by weight of the fluorine atom-containing compound to 100 parts by weight of the resin capable of forming a formed product having transparency.

2. The transparent material according to claim 1, which further comprises a fluorine atom-containing polymer that comprises a repeating unit represented by the following formula (12):

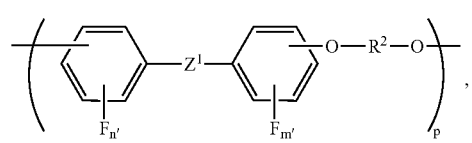

(12)

in the formula, $R^2$ represents a divalent organic group having 1 to 150 carbon atoms; $Z^1$ represents a divalent organic group or a direct bond between benzene rings, m' and n' are same or different and each represents the number of fluorine atom bonded to the benzene ring and is an integer of 0 to 4; m'+n' is 1 or more; p represents a polymerization degree; and a hydrogen atom of the benzene ring may be replaced with a substituent group other than a fluorine atom, and/or a repeating unit represented by the formula (13):

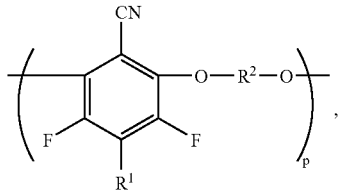

(13)

in the formula, $R^1$ represents an alkyl group having 1 to 12 carbon atoms, an alkoxy group having 1 to 12 carbon atoms, an alkylamino group having 1 to 12 carbon atoms, an alkylthio group having 1 to 12 carbon atoms, an aryl group having 6 to 20 carbon atoms, an aryloxy group having 6 to 20 carbon atoms, an arylamino group having 6 to 20 carbon atoms, or an arylthio group having 6 to 20 carbon atoms, which each may contain a substituent group; $R^2$ represents a divalent organic group having 1 to 150 carbon atoms;

and p represents a polymerization degree.

3. A method for using a composition comprising a polymer and/or compound having a fluorine atom directly bonded to an aromatic ring as an additive for resin, wherein the fluorine atom-containing polymer comprises a repeating unit represented by the following formula (12):

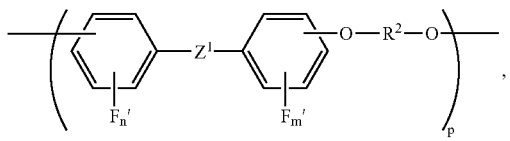

(12)

in the formula, $R^2$ represents a divalent organic group having 1 to 150 carbon atoms; $Z^1$ represents a divalent organic group or a direct bond between benzene rings; m' and n' are same or different and each represents the number of fluorine atom bonded to the benzene ring and is an integer of 0 to 4; m'+n' is 1 or more; p represents a polymerization degree; and a hydrogen atom of the benzene ring may be replaced with a substituent group other than a fluorine atom and/or a repeating unit represented by the formula (13):

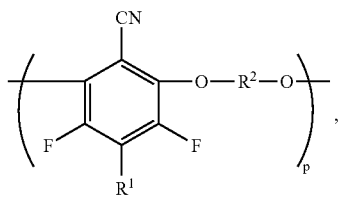

(13)

in the formula, $R^1$ represents an alkyl group having 1 to 12 carbon atoms, an alkoxy group having 1 to 12 carbon atoms, an alkylamino group having 1 to 12 carbon atoms, an alkylthio group having 1 to 12 carbon atoms, an aryl group having 6 to 20 carbon atoms, an aryloxy group having 6 to 20 carbon atoms, an arylamino group having 6 to 20 carbon atoms, or an arylthio group having 6 to 20 carbon atoms, which each may contain a substituent group; $R^2$ represents a divalent organic group having 1 to 150 carbon atoms; and p represents a polymerization degree, which method comprises adding said composition to said resin.

4. An optical fiber, an optical waveguide, an optical recording disk, an optical film, or a substrate for display made of material comprising the transparent material according to claim 1.

5. The transparent material according to claim 1, wherein the resin capable of forming a formed product having transparency is an acrylic resin or a polycarbonate resin.

6. The transparent material according to claim 1, wherein the transparent material contains a ratio of 5 to 100 parts by weight of the fluorine atom-containing compound to 100 parts by weight of the resin capable of forming a formed product having transparency.

7. The transparent material according to claim 1, wherein the transparent material contains a ratio of 10 to 100 parts by weight of the fluorine atom-containing compound to 100 parts by weight of the resin capable of forming a formed product having transparency.

\* \* \* \* \*

UNITED STATES PATENT AND TRADEMARK OFFICE
CERTIFICATE OF CORRECTION

PATENT NO. : 7,678,881 B2
APPLICATION NO. : 10/908843
DATED : March 16, 2010
INVENTOR(S) : Ai Nishichi et al.

It is certified that error appears in the above-identified patent and that said Letters Patent is hereby corrected as shown below:

Please amend formula (1) appearing in claim 1, column 40, line 30, as follows:

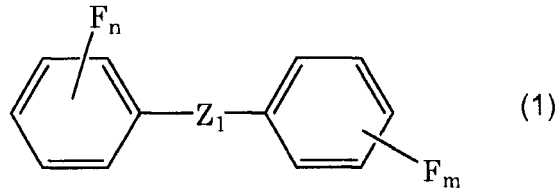

to read as follows:

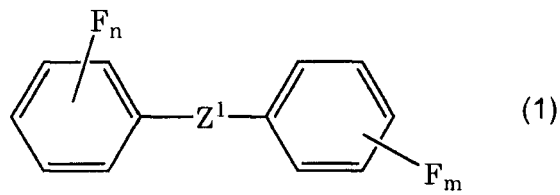

Signed and Sealed this

First Day of June, 2010

David J. Kappos
*Director of the United States Patent and Trademark Office*